(12) United States Patent
Harvill et al.

(10) Patent No.: US 12,400,251 B2
(45) Date of Patent: Aug. 26, 2025

(54) GLOBALGLOBAL ILLUMINATION AND PRINTED LAYER LIGHT TRANSPORT MODELS FOR CUSTOMIZING PHYSICAL PRODUCTS DESIGNED DIGITALLY

(71) Applicant: Zazzle Inc., Menlo Park, CA (US)

(72) Inventors: Leslie Young Harvill, Olympia, WA (US); Charles Ohiaeri, Menlo Park, CA (US); Robert I. Beaver, III, San Francisco, CA (US)

(73) Assignee: Zazzle Inc., Menlo Park, CA (US)

( * ) Notice: Subject to any disclaimer, the term of this patent is extended or adjusted under 35 U.S.C. 154(b) by 237 days.

(21) Appl. No.: 18/203,147

(22) Filed: May 30, 2023

(65) Prior Publication Data

US 2024/0403930 A1    Dec. 5, 2024

(51) Int. Cl.
G06Q 30/06     (2023.01)
G06Q 30/0601   (2023.01)

(52) U.S. Cl.
CPC ................................ *G06Q 30/0621* (2013.01)

(58) Field of Classification Search
CPC ................ G06Q 30/0621; G06T 15/06; G06T 2219/2012; G06F 2113/10
USPC ........................................................ 705/26.5
See application file for complete search history.

(56) References Cited

U.S. PATENT DOCUMENTS

| | | | |
|---|---|---|---|
| 8,090,461 B2 * | 1/2012 | Ohiaeri | G06Q 30/0621 |
| | | | 705/26.5 |
| 9,087,355 B2 * | 7/2015 | Ohiaeri | G06F 30/00 |
| 2003/0179197 A1 * | 9/2003 | Sloan | G06T 15/506 |
| | | | 345/426 |

(Continued)

FOREIGN PATENT DOCUMENTS

| | | |
|---|---|---|
| EP | 2798602 | 11/2014 |
| WO | WO-2020208421 A1 * | 10/2020 ............ G01J 3/0264 |

OTHER PUBLICATIONS

Media Release: solidThinking, Inc. (a wholly owned subsidiary of Anonymous. MediaNet Press Release Wire [Sydney] Jul. 23, 2008; retrieved from Dialog on Mar. 18, 2025 (Year: 2008).*
EP Search Reprt dated Nov. 16, 2023 for Application No. 23176046.3.
Martin Sik et al. "Robust Light Transport Simulation via Metropolised Bidirectional Estimators", ACM Trans. Graph., vol. 35, No. 6, Article 245, Publication Date: Nov. 2016.

(Continued)

*Primary Examiner* — Yogesh C Garg
(74) *Attorney, Agent, or Firm* — Patterson & Sheridan LLP.; Malgorzata A. Kulczycka

(57) ABSTRACT

A method comprises: generating a user interface; receiving user content to be applied to a surface of a digital product; generating a product description describing the digital product; generating a three-dimensional representation of the digital; generating a texture input-light output map for the digital product; generating calibrated color layers and calibrated luminance layers for the digital product; generating a printed layer light transport model based on the calibrated color layers and the calibrated luminance layers; generating a rendering based on the printed layer light transport model, the calibrated color layers, the calibrated luminance layers, the product description, and the three-dimensional representation of the digital product; transmitting the printed layer light transport model, the calibrated color layers, the calibrated luminance layers, the product description, and the three-dimensional representation of the digital product to a manufacture to cause the manufacturer to manufacture a physical product corresponding to the digital product.

20 Claims, 15 Drawing Sheets

(56) References Cited

U.S. PATENT DOCUMENTS

| | | | |
|---|---|---|---|
| 2005/0177453 A1* | 8/2005 | Anton | G06Q 10/087 |
| | | | 705/26.81 |
| 2006/0226563 A1* | 10/2006 | Albert | G03H 1/0276 |
| | | | 428/156 |
| 2007/0083383 A1* | 4/2007 | Van Bael | G06F 30/00 |
| | | | 715/772 |
| 2009/0046099 A1* | 2/2009 | Duca | G06T 15/50 |
| | | | 345/426 |
| 2009/0070666 A1* | 3/2009 | Eilers | G06F 16/9577 |
| | | | 715/240 |
| 2010/0185309 A1 | 7/2010 | Ohiaeri et al. | |

OTHER PUBLICATIONS

Henrik Wann Jensen, "A Practical Model for Subsurface Light Transport", ACM SIGGRAPH 2001, Aug. 12-17, 2001, Los Angeles, CA, USA © 2001 ACM 1-58113-374-X/01/08.

* cited by examiner

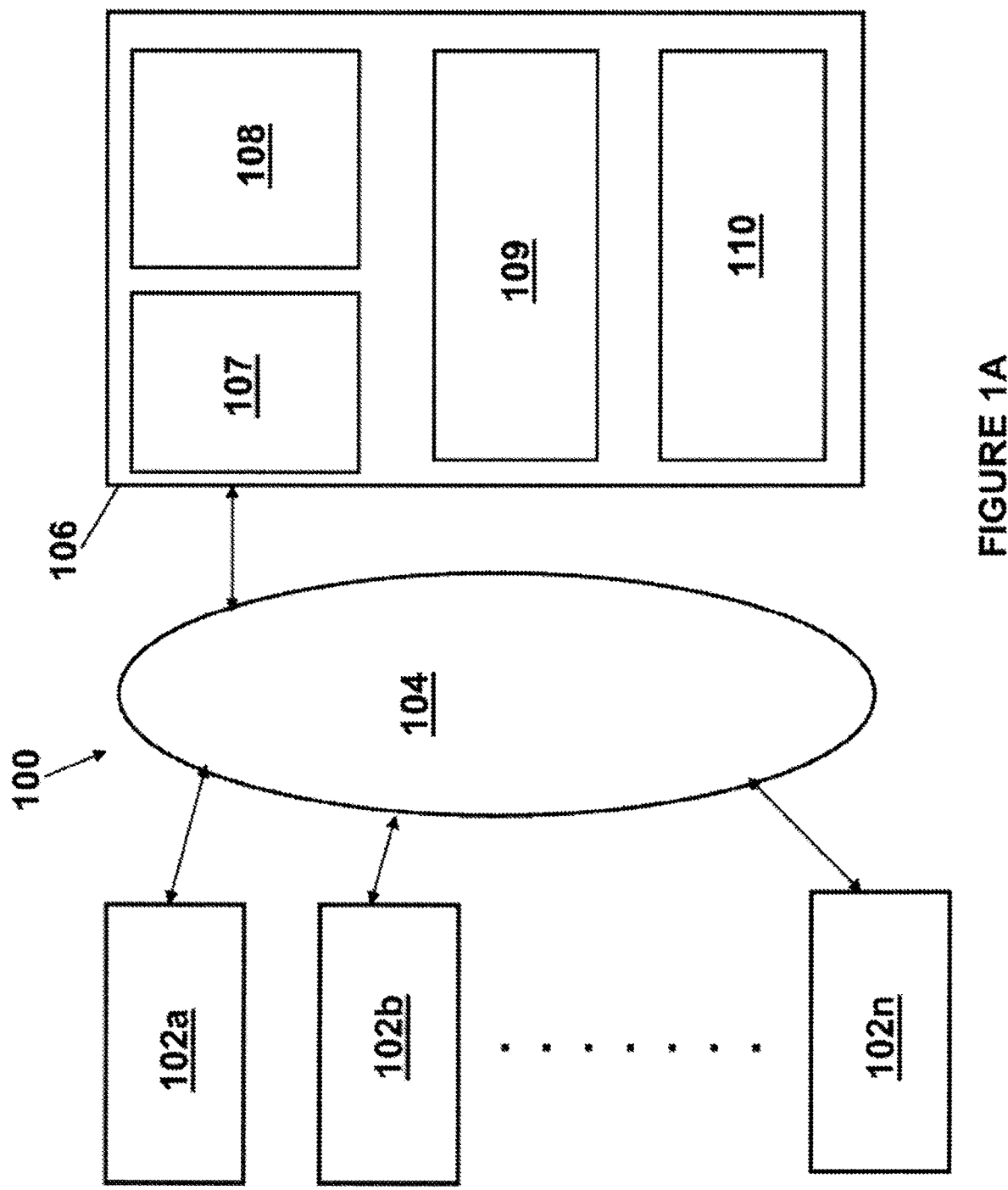

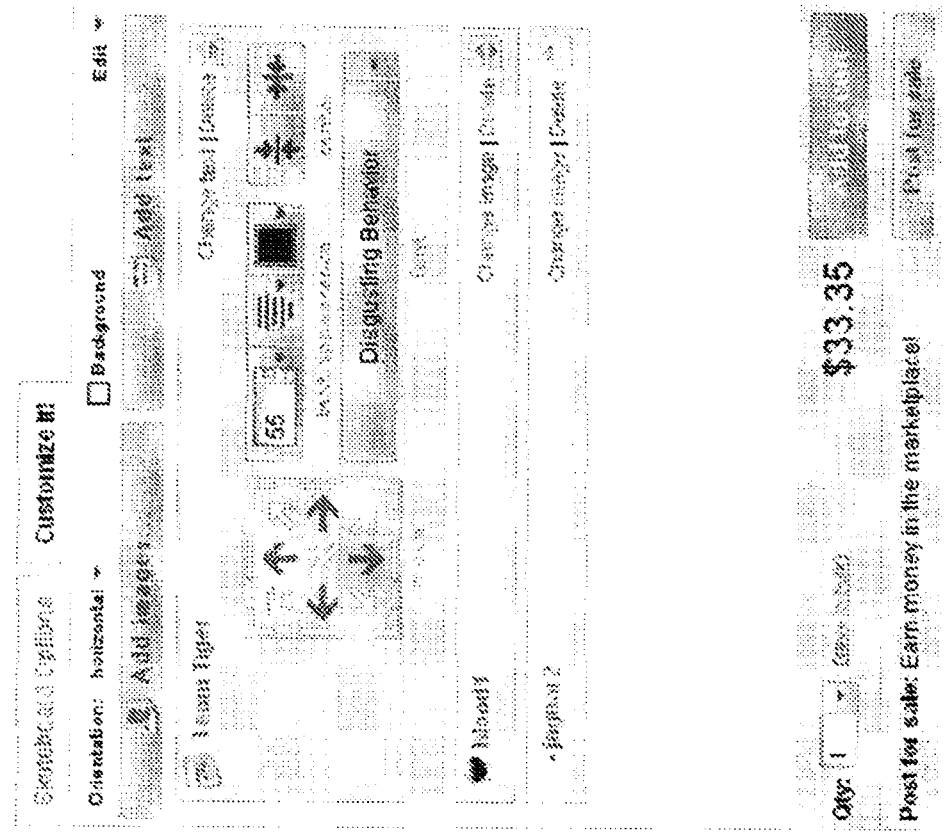
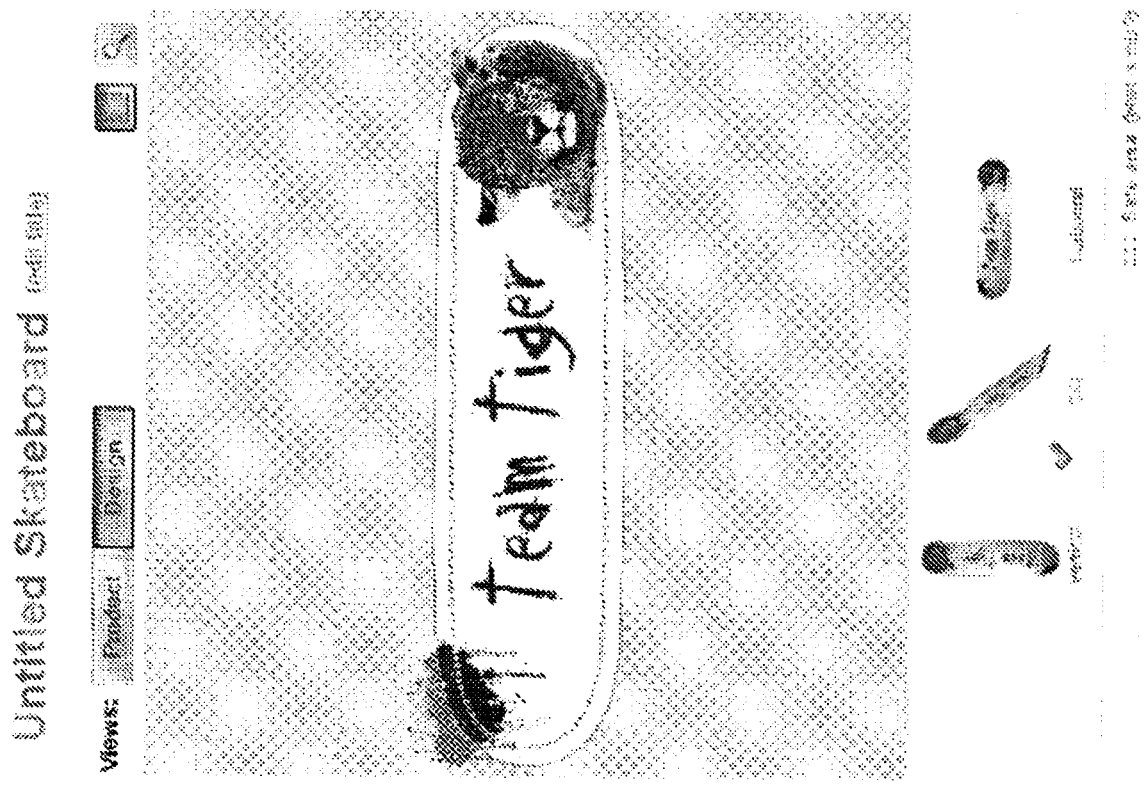
FIGURE 3

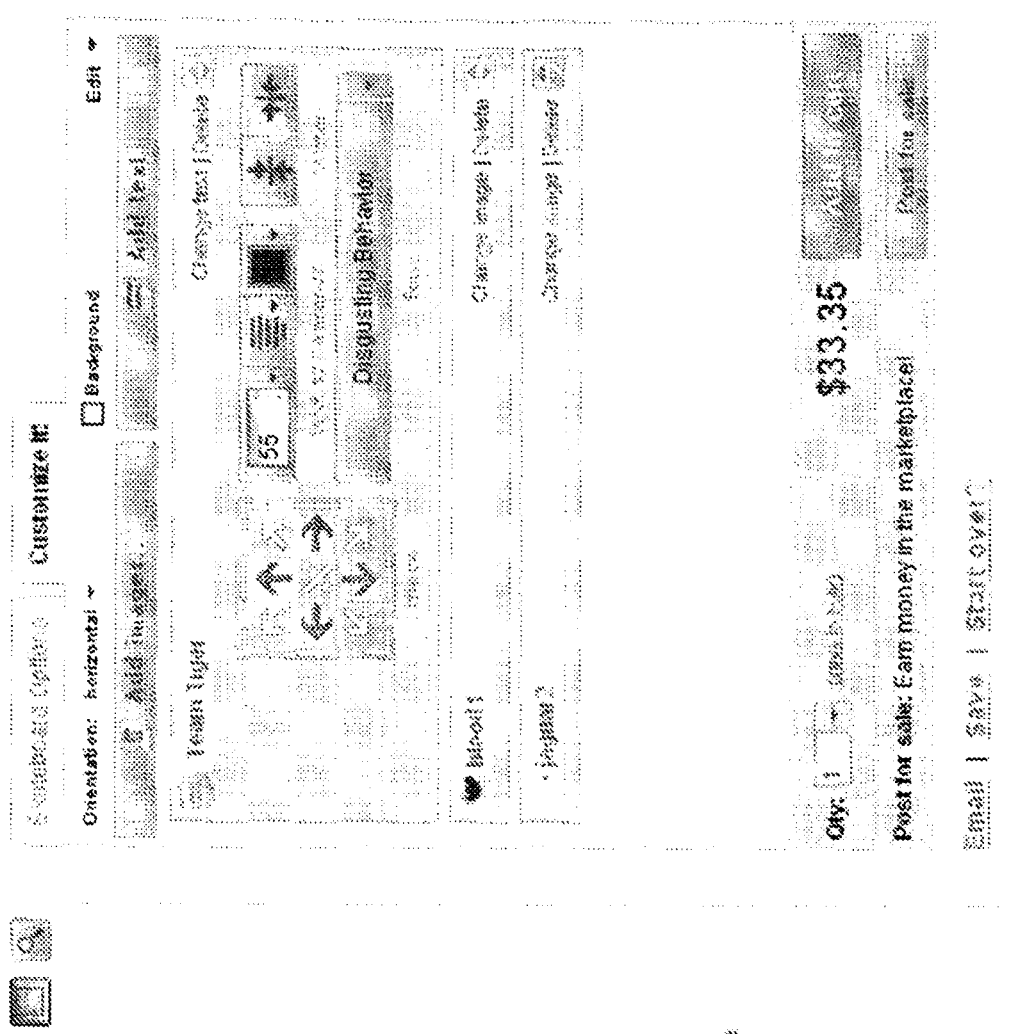
FIGURE 4B

GLOBALGLOBAL ILLUMINATION AND PRINTED LAYER LIGHT TRANSPORT MODELS FOR CUSTOMIZING PHYSICAL PRODUCTS DESIGNED DIGITALLY

FIELD OF THE DISCLOSURE

The system relates to a product customizing system and method.

BACKGROUND

These days, relatively few digital designs of products are produced in large volumes, and even fewer have been digitally customized to capture the complex reflectivity models of the digital designs before the corresponding physical products are manufactured. The manufacturing processes available on the market and designed to visualize digital designs are based on a color printing process and fail to capture many of the optical effects available using modern UV printing, thermal transfer film processes, metal film transfer processes, and layered 3D printing.

Some manufacturing processes available on the market may produce volumetric forms (e.g., generate 3D models of digital products) through stereo-lithography and fused deposition modeling.

However, there is currently no unified method for the commercial design and manufacturing of layered, optically active surfaces for digital products having complex curved forms and shapes.

Furthermore, while there are some systems for managing and applying a specialized subset of color films (e.g., cyan, magenta, and yellow process color films) and for manufacturing custom lenses and gratings in the optics industry, none of them provide interactivity and interactive applications of the digital design's components based on the optical surfaces of the digital designs.

Thus, it is desirable to provide a customized product system/method that allows interactive customization of digital products and collaborative validation of the interactively customized products before the customized digital designs are sent to the manufacturer for manufacturing the corresponding physical products.

BRIEF DESCRIPTION OF THE DRAWINGS

In the drawings:

FIG. 1A illustrates an example of an embodiment of a product customization system;

FIG. 3 illustrates an example of a product design user interface of the product customization system;

FIGS. 4A and 4B illustrate an example of a product view user interface of the product customization system when a product has a customized user design;

DETAILED DESCRIPTION

Figure 1B:
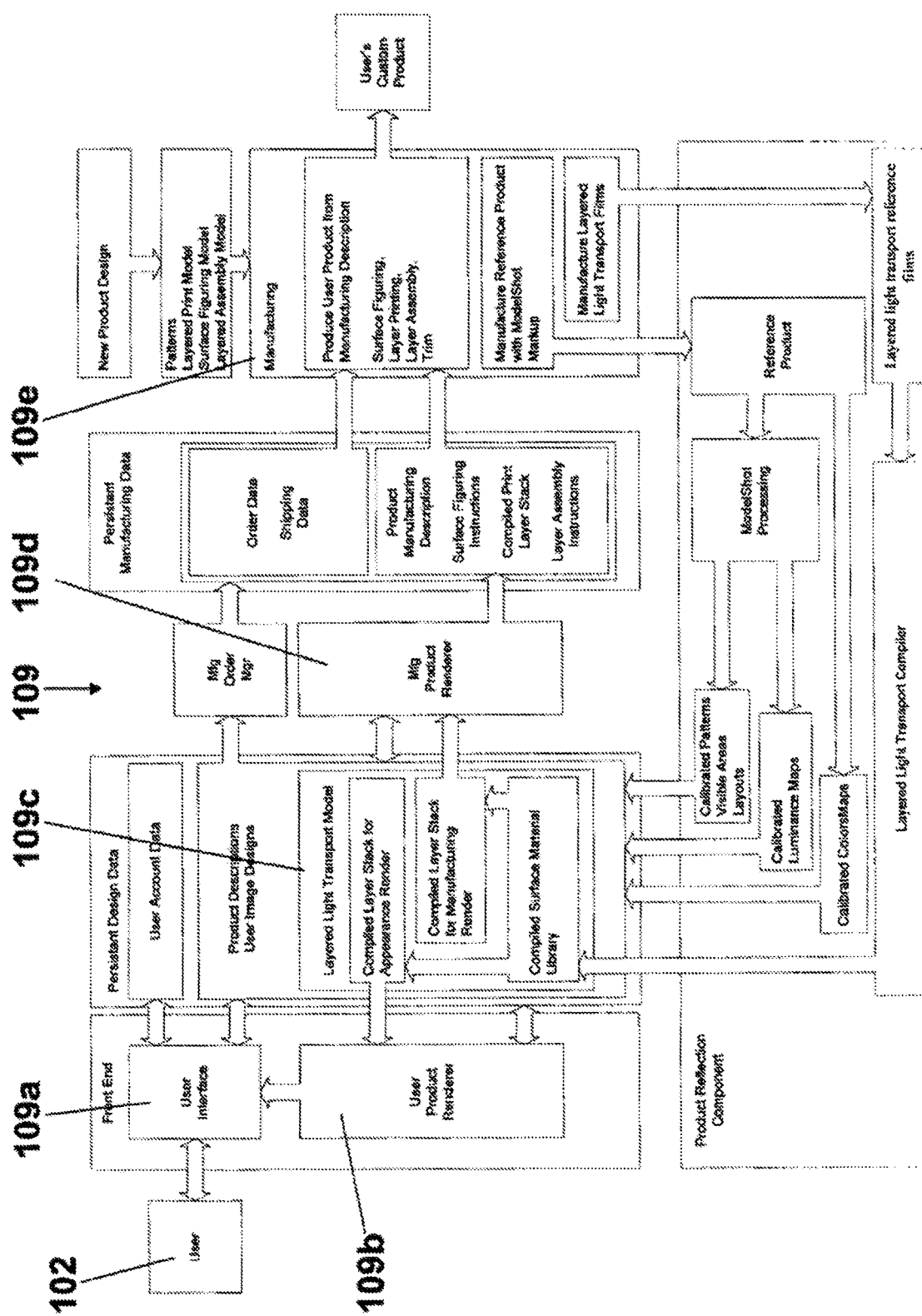
FIG. 1B illustrates more details of the product customization unit that is part of the product customization system.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach. Embodiments are disclosed in sections according to the following outline:

1. GENERAL OVERVIEW
2. PRODUCT CUSTOMIZATION
    2.1. DIGITAL PRODUCT CUSTOMIZATION
    2.2. DIGITAL PRODUCTS AND THEIR PHYSICAL TWINS
    2.3. PRINTED LAYER LIGHT TRANSPORT MODEL
        2.3.1. PRINTED LAYER LIGHT TRANSPORT MODEL CAPTURING VISUAL EFFECTS
        2.3.2. COMPONENTS OF THE PRINTED LAYER LIGHT TRANSPORT MODEL
        2.3.3. BI-DIRECTIONAL REFLECTANCE FUNCTION
        2.3.4. DIFFUSION EFFECT
        2.3.5. FOIL EXAMPLE
        2.3.6. TEXTURE MAPS
        2.3.7. RENDERING
3. IMPLEMENTATION EXAMPLE
4. USER INTERFACE EXAMPLE
5. USER RENDERER EXAMPLE
6. USER LIGHTING GEOMETRY EXAMPLE
7. PRINTED LAYER LIGHT TRANSPORT MODELING
    7.1. MODELING EXAMPLE
    7.2. LAYERS EXAMPLE
8. MANUFACTURING PRODUCT RENDERER
    8.1. MANUFACTURING EXAMPLE
    8.2. MANUFACTURING PROCESS EXAMPLE
9. EXAMPLE SYSTEM
10. EXAMPLE FLOW CHART
11. IMPLEMENTATION MECHANISMS

1.0. General Overview

The system and method presented herein are applicable to a web-based client-server architecture system for performing interactive customizations of digital products. They may be also applicable to producing and visualizing digital products and to generating manufacturing instructions that, when executed by a manufacturing computer system, to cause the system to reproduce the shapes, colors, reflections, and other characteristics of the customized digital products in the corresponding manufactured physical product.

The presented system and method may be used to customize any digital product and use any type of interactivity. Interactivity may be implemented using specialized user interfaces configured to interactively customize the digital products to obtain the corresponding customized digital products, and then to automatically generate manufacturing instructions for manufacturing the corresponding physical products that have characteristics matching the characteristics of the customized digital products. Interactive customization may be implemented by integrating, in a user interface, the functionalities that allow users to provide their constraints for the customized digital products and applying the user-provided constraints to digital products.

The digital products in this context include any type of products that may be displayed and customized using the functionalities of, for example, a user interface such as a graphical user interface or the like. The user interface may allow a user to, for example, provide the content that the user wants to have added or applied to a digital design. The content may include text, images, graphics, various types of surface finishes, and the like.

The system may be used to design, for example, customized smartphone cases, customized skateboards, customized globes, customized baseball bats, customized car tops, or any other products with even, uneven, or/and textured surfaces that can be customized by a user by adding the user's customized designs.

Implementations of the presented approach are not limited to any particular implementation. The presented approach can be implemented in hardware, software, or a combination of hardware and software, and may be implemented in client/server architecture, in a web server, in a terminal, in a peer-to-peer system, and the like.

2.0. Product Customization

The presented approach provides mechanisms for interactively customizing digital products to produce customized digital products. The approach also allows for capturing the visual characteristics of the customized digital products and generating manufacturing instructions that allow the generation of corresponding physical products that have the captured visual characteristics of the customized digital product. Hence, the presented approach allows, for example, interactively customizing a digital product and generating manufacturing instructions for manufacturing a corresponding physical product that is a physical "twin" of the customized digital products in terms of the product's visual appearance.

2.1. Digital Product Customization

The presented approach overcomes several shortcomings of the other approaches developed in product customization technology. For example, the presented approach allows customizing and representing digital designs more realistically than the designs represented using other methods, including those methods that are unable to represent desired colors on, for example, plastic surfaces that, once exposed to UV light, harden, and thus lose the desired color pigment.

In some implementations, the presented approach allows a user to interactively provide constructs for the visual appearance of a digital product, and modify and enhance the constructs until the desired optical effects represented on the customized digital product satisfy the user's requirements and expectations.

The desired optical effects may include various visual effects represented in digital products. Non-limiting examples of the effects may include translucency, transparency, reflectivity, opacity, ambient light, and the like. As described in detail later, the effects may be represented using the corresponding special layers, and layers may be combined in a specific way to allow the realistic and accurate representation of the desired optical effects on the digital products.

The interactions and co-dependence between the individual effects in some implementations may be captured using techniques such as ray tracing, radiosity, and the like. For example, once a 3D model of a digital design (i.e., a product) is created, a desired base color may be applied to the design. Then, the light sources may be defined for a scene that includes the design, and then the light reflections and emissions with respect to the design are simulated. The simulation may be performed using the ray tracing approach, radiosity approach, and the like, which, however, require substantial computational resources. Therefore, those techniques are usually time-consuming, expensive, and sometimes unproductive.

Those difficulties are overcome using the approaches presented herein. In the approach, each of the optical effects is represented using a corresponding layer. For example, the opacity of the substrate (i.e., the surface of the product) may be represented in an opacity layer that is specially designed and tuned to capture the specific opacity characteristics of the substrate/surface. Furthermore, the translucency of the substrate of the same digital design may be captured using a translucency layer that is specially designed and tuned to capture the specific translucence characteristics of the substrate. That layer would capture the interactions between the translucent property of one color of the substrate and another color of the substrate. Additional individual layers may be designed and tuned for other optical effects of the substrate of the digital design. Several layers may be superimposed onto each other to generate an optical effect model for the digital design.

An image rendering application may use several superimposed layers to create so-called an optical diffusion effect, which is a visual, digital representation of the product as if the product was illuminated by light sources in the real world.

The presented approach overcomes the shortcomings of previous approaches. For example, the presented approach overcomes an often-undesirable visual effect created when different colors are blended together. An example of such an undesirable effect is when a light yellow color is printed over a black color; this usually causes the blending of the colors to produce an often-undesirable visual effect of green.

The proposed solution uses applications of complex translucent layers. This may create attractive optical effects, especially in some complex cases, such as skin tones as reproducing some skin tones may include applying a translucent color-similar to the effects achieved in the Venetian paintings by the Italian painters.

In the cases of reproducing skin tones, a warm-color underlayer is used, and then a translucent layer to represent a flesh tone on top of the warm underlayer. The produced effect is similar to the physical properties of flesh itself. By modifying the intensity and hues of the layers, the grays, and translucent layers, the pearly effects may be achieved as in, for example, the Titian painting (i.e., Titian Vercelli or Vercelli, known in the US as Titian, one of the known Italian painters of the Renaissance).

The real optical effects are achieved herein using the layers of paint. The idea is to lay down thin films with certain characteristics and use the thin films to build up different optical characteristics. The transparency, opacity, and translucency give certain effects when the transparent color is applied over a lighter color; this often allows for achieving warm watercolor effects. When a translucent, lighter color, like a gray color is applied over a red darker red color, the effect is a cooler lighter color through the dispersion of light. This allows for achieving the pearly, blue-red effects.

However, the current software for controlling print processes is unable to model these effects. This software (also known as a RIP, "Raster Imaging Software") often can display a digital image of the physical print (called Soft Proofing). Although RIPs allow looking at the computer monitor to verify the visual effects before the physical object is printed, the actual printing process may produce a visual effect that is different from what is intended if the printed layers are not ordered and printed in a highly constrained manner. Indeed, most of those printing processes cannot manage the optical layers to reproduce, for example, translucent effects. Neither can they model the reflectance of the constructive interference of a specific color, like the Lipmann-Bragg effect, where several thin layers are deposited over each other, each having a different refractive index.

In sharp contrast, according to the presented approach, not only the translucent visual effects can be reproduced, but also other effects, such as metallic effects and the like, to make a physical product appear desirable, interesting, and attractive. The current known processes do not allow specifying such visual effects and do not perform, for example, a soft proof, or the like. Furthermore, they do not allow visualizing such multilayer effects and seeing how finished artifacts would look.

However, visualizing and validating the visual effects is often critical in designing custom products. It is also important to see how the finished physical products would look before the physical products are actually printed (e.g., manufactured).

2.2. Digital Products and Their Physical Twins

Visualizing the multilayer effects on digital products is very desirable. For example, when designing a smartphone case having, for instance, a base color, a translucent layer, a metallic layer, and the like, is important to be able to accurately reproduce, visualize and fine-tune those effects on the digital products using a computer system.

It is also important to generate manufacturing instructions for accurately reproducing those effects in physical products corresponding to digital products. For example, if a digital product is a digital representation of a phone case, it is important to accurately visualize the multilayer effects on a physical phone case (corresponding to the digital product) and use the manufacturing instructions to manufacture the effects on an actual manufactured physical phone case.

According to another example, when designing a skateboard having colorful translucent and sparking effects, it is important to be able to accurately reproduce, visualize and fine-tune those effects on a digital product generated using a computer system. It is also important to generate manufacturing instructions for reproducing those effects in a physical skateboard and use the manufacturing instructions to manufacture the effects on an actual manufactured physical skateboard.

In some implementations, the presented approach combines improved ray tracing techniques, radiosity techniques, and others. The improvements allow generating of individual layers for visualizing a digital product and superimposing the layers onto a base color of the product to achieve the desired visual effects. The presented approach also allows capturing the superimposed layers in the manufacturing instructions in such a way that the manufactured physical product (i.e., a twin to the digital product) looks alike and captures the desired visual effects.

The approach includes techniques that allow following the light that comes from light sources (i.e., the outside lights) and penetrates through layers described above, and then model the light reflections to capture the light that is reflected back.

A set of given optical effects is captured by a set of layers. For example, to achieve a beautiful pearl tone of skin, the approach includes designing layers that would allow the reproduction of a dark or a darkish-kind of warm gray color. Then, a very translucent white layer is designed. Then another layer is designed to capture the refractive index of the light. Then another layer is designed to capture a translucent white color. This essentially amounts to building up a set of layers that, when superimposed, allow the creation of, for example, the pearl reflectance effect.

In some implementations, the approach may include creating five or more layers, and the superimposed structure might be five-layer-thick. In the five-layer-thick structure example, each optical pixel of the digital object (or the digital image) may have five corresponding layers, which when superimposed, allow reproducing, for example, the pearl effect.

Once a multilayer structure is created, a corresponding light transfer model may be generated based on the structure. The light transfer model is created to model the behavior of the light as the light penetrates the layers and/or reflects from the layers. The model may be used to model the visual effects, fine-tune them, and the like.

Furthermore, the model may be used to model the visual effects as the objects, as the light moves back and forth, and to see the modified visual effects represented on a computer screen. The effects can also be printed, and the printout may be used to correlate the achieved digital visual effects with the desired effects.

Suppose that a designer would like to design a smartphone case with a visual effect representing a shiny butterfly. Suppose that the designed butterfly is a blue-morpho butterfly (e.g., as shown in wikipedia.org on the Morpho page). To reconstruct (or digitally capture) such an effect, the designer would want to capture a constructive interference effect. This may include designing a thin layer having refractive visual properties. This may be analogized to building up a fringe layer so that it reflects the blue color and constructing a corresponding layered printing effect.

Then additional layers, capturing the additional optical effects such as shines, reflectance, translucency, and the like, are created. For each printed pixel, a corresponding pixel of the superimposed layers is applied to produce the desired visual effect on a corresponding physical product. Sometimes, the layer structure may include six layers (or more) of specified thickness. For example, there might be some layers with half wavelength of blue light, and the layers may be superimposed one over the other, and so forth. There also might be a layer with a refractive index change. The goal in this example would be to capture, for example, the pure blue reflection on the surface of the physical product.

Another factor to consider is the surface of the object itself, and more specifically the color and the texture of the surface. Suppose that the surface has a certain type of ridge pattern on it so that it reflects the light in a certain way—depending on the position and direction of the light source. For example, if the light source (or light sources) is moved, then the reflections projected on the surface depend on the surface texture. Therefore, the refraction of light from the surface texture may cause a certain visual effect, and consequently, a different diffraction effect.

If one has the capabilities of printing, for example, hundreds of lines per millimeter of physical media, then one could print, for example, a diffraction grading.

2.3. Printed Layer Light Transport Model

2.3.1. Printed Layer Light Transport Model Capturing Visual Effects

Different visual effects can be added to a palette of desired visual effects. Hence, to implement a desired effect on a particular surface or an object, the desired effects may be retrieved from the already-created palette. One could have a palette of different layers, and the layers could be combined, superimposed, and then printed. A collection of layers that can be superimposed over each other is referred to as a printed layer light transport model.

A printed layer light transport model (and a corresponding palette of layers) can be validated. The validation may include determining whether the model sufficiently or accurately captures certain optical effects such as translucency, transparency, reflectivity, refraction, and the like, on surfaces such as pearl surfaces with rips, and the like.

It is also important to be able to capture the printed layer light transport model and the layers in manufacturing instructions. The manufacturing instructions can be sent to a manufacturing company (e.g., a manufacturer) to have the manufacturer produce the corresponding physical products. The manufacturing instructions need to be compatible with modern printers and need to allow using a set of tools, or a set of palettes, to apply the visual effects in the same way as an artist applies the paint to canvases to create the visual effects on the canvases.

Suppose that a designer would like to design a smartphone case having an application of an image depicting a woman wearing a pearl necklace. During the digital design phase, the designer would design (or use from the already prepared palette) several layers that allow reproducing correctly the flesh tones of the skin. The designer could also design (or use from the already prepared palette) several layers that allow reproducing correctly the pearl of the pearl necklace. The corresponding layers for the corresponding areas of the image would be superimposed. That is referred to as a layering technique. The goal is to capture the certain effects of the human flesh of the actual interaction of light through flesh and to capture the interaction of light through the pearls.

Typically, the layers are associated with the object's surface, material, and other properties of the object or property. Each layer can be viewed as a layer in a physical painting. Each layer has its own color, translucency, refractive index, and so forth. Hence, when one layer is superimposed over another, a corresponding optical effect is created. This was explained above in reference to the optical effect of a pearl.

The printed layer light transport model and its description may be captured in the manufacturing instructions that modern printers can handle and understand. Hence, if a designer wishes to capture, for example, a pearl effect on a surface of an object, and have the corresponding optical effect displayed on a particular area of the corresponding physical object, then the corresponding effect can be captured using the above-described layers. Subsequently, the layers can be captured in the corresponding manufacturing instructions.

This approach allows representing the different visual effects more genuinely and accurately than using just, for example, a picture with the visual effects. For example, to represent the pearls using this approach, a designer would create the corresponding layers and the printed layer light transport model, then use a system that would automatically generate corresponding manufacturing instructions, which when executed, would allow manufacturing of the physical product that represents the pearls more accurately than just a picture of the pearls.

From the perspective of the historical evolution of photography, one of the things that happened in the transition from fine art paintings to photography was that a great deal of the optical visual effects have been lost. For example, oil paintings from the well-known Renaissance period have jewel-like effects captured in the canvas; the effects have jewel-like quality, metallic that really shimmer, and so forth. However, even the most advanced photography techniques do not capture those effects.

In sharp contrast, the presented approach allows capturing those effects as it was captured in the famous oil paintings—but using computer-implemented methods and manufacturing printing.

For example, suppose that an object is a candy box. The box should be shiny and have transparent properties, reflective properties, and the like. However, the available printing techniques include foil stamping and a gloss finish applied over the base color of the box. However, that does not capture a transparency layer or embossed foil to accurately represent the reflective effects.

In sharp contrast, using the presented approach, the above-mentioned special visual effects may be captured in a printed layer light transport model and the corresponding layers. Once the model and the layers are created, they can be captured in the corresponding manufacturing instructions that allow the multilayer printing to capture the special effects on the physical objects. This may include designing and generating the means to create the layers and applying them on top of the optically active surfaces.

The presented approach allows for managing and predicting reliably the interactions between the light and the object surfaces and visualizing and viewing corresponding effects before the products are printed. The printed layer light transport model is the model that captures the interference between the light and the surfaces. It is not, for example, just a transformation of pixel characteristics to a physical object. Instead, it is part of a feedback loop that allows generating and developing of a catalog of all of the different optically active surfaces that can be printed in a custom flow.

Desired effects may include, for example, a custom effect, a foil surface, UV characteristics, the thickness of the surface, transparency, and the like. It may also include an additional optical film that is translucent. All these visual effects may be applied to the optically active surfaces in order to really model the realistic appearance of the physical objects.

The printed layer light transport model may be implemented as a sophisticated printed layer light transport model that can capture complex and interrelated optical visual effects. The model may be created automatically or with the help of a designer who can also tweak and modify the model according to the designer's preferences.

In comparison with, for example, Photoshop or Illustrator, which allows applying certain looks (e.g., a metallic look) to certain regions of the digital image, the presented approach allows modeling the light transport for the objects depicted in the digital image. This may include capturing, for example, a bright pearl effect that has an aluminum foil under it, and then three layers of alternating translucent and transparent UV print. This technique is not available either in Photoshop or Illustrator.

Furthermore, the presented approach captures the light interactions as the object is viewed from different directions and angles. For example, once a printed layer light transport model is created for a scene (or a digital object) assigned to the scene/object, and once the object is viewed from different directions and angles (e.g. if the object is zoomed-in and out, rotated, etc.) the optical effects are captured accurately and adequately to the new position of the object.

To properly design a printed layer light transport model, a designer determines all those things in advance, even not knowing exactly what it was going to look like. Once the designer prints the example object, he tests the printed object to determine whether the model is adequate and accurate. Some proofing techniques can be automated using specialized computers and soft proofing tools.

2.3.2. Components of the Printed Layer Light Transport Model

In some implementations, a printed layer light transport model implements advanced and improved techniques for tracing light and reflections for capturing, for example, the light reflections and shadows in scenes comprising objects exposed to light sources and having reflective surfaces. The advanced techniques include improved and enhanced radiosity and raytracing alike techniques implemented using layers.

A printed layer light transport model, utilizing the improved and enhanced radiosity and ray tracing techniques, captures the effects of various different lights and reflection elements that are present in a scene containing various objects. It also captures the transport and reflected light, and represents the way the light is modified and transported within the scene.

The printed layer light transport model comprises a set of constraints used to solve a particular problem. The printed layer light transport model defines and initiates the constraints for capturing light inner reflections between illuminated, illuminating, and/or reflecting objects in a scene. Building a printed layer light transport model may include, for example, building the constraints for layers of materials superimposed on a substrate of an object.

A substrate may be, for example, a sheet of paper. The paper may be covered with, for instance, a layer of foil applied to the paper. Printing of the substrate covered with foil may include printing in such a way that, for example, the shiny areas, less shiny areas, and non-shiny areas are represented and depicted correctly. For example, the shiny areas may have certain light transport characteristics that could be represented by an array of the coming-in light in one direction and reflected in another direction.

However, since the light does not disperse perfectly and since the substrate is not a perfectly plain surface, the light does not reflect or illuminate the substrate perfectly in one direction. In fact, the light distribution may be curved in different directions and may have different intensities in different directions. This may be represented using, for example, a bi-directional reflectance function, also referred to as a bdrf function.

2.3.3. Bi-Directional Reflectance Function

A bi-directional reflectance function allows capturing the light characteristics using, for example, half of a sphere, i.e., a hemisphere, and looking at the light coming in at and reflecting from each point of the hemisphere.

In the case of, for example, transparent materials, the bdrf function uses a sphere instead of a hemisphere and captures the light characteristics in terms of the light input to the sphere and output from the sphere. The bdrf function captures the light characteristics as the light bounces back from the sphere, not just a bi-directional radiance function in terms of reflection. It also captures the light transmission.

In the case of a substrate that is relatively consistent in terms of the material characteristics, such as a paper covered with a particular film of a particular material, a bi-directional radiance function may be used. That bdrf may be configured with some modules having some extra parts and means for representing the way the light transmits, diffuses, and the like as if the light were represented by many multiple, diffuse sources.

The bdrf-based approach allows representing the light rays coming from different (any) angles and then outputting the reflected rays to either another substrate (e.g., the film) or back to a viewer.

In some cases, the process may be repeated by the same bdrf function for different light rays, different angles between the light source and the substrate surface, different substrates, and/or both.

A first film layer may be placed on the top of a substrate. On the top of that layer, there might be another film layer, and so forth. In such a case, the function determined for the light model is propagated from the layer to the next layer. This involves propagating the light from one layer to another layer, or back to the viewer's eye. This is referred to as transporting the light, or the light transport.

Light transport may be captured using, for example, radiance functions that are operating on the full sphere. The process usually includes significant calculations. The complexity of the calculations usually depends on how many layers of material are placed on the substrate. The complexity also depends on the quality of the layers and the physics of the layers.

2.3.4. Diffusion Effect

In physics, a diffusion effect captures the light behavior as the light illuminates the surface and disperses (i.e., diffuses) from the surface. In the presented approach, the light illuminates a set of superimposed layers and diffuses within the layers, is transmitted through the layers back out to the viewer's eye as well, and is combined with the light coming back from the other directions. Capturing this type of diffusion effect is usually quite complicated as there are hundreds and millions of interactions between the light penetrating the layers, dispersing from the layers, and combining with the light diffusing from other layers.

To capture the diffusion effect, multiple calibrated luminance maps are used. Each map is modeling a corresponding calibrated luminance layer, which is then a part of a printed layer light transport model.

Some surfaces are referred to as rich surfaces. Examples of rich surfaces include porous surfaces, uneven surfaces, and the like. Diffuse light effects for those surfaces may be captured by building a set of corresponding layers. The set of such layers may be used to reproduce the light diffusion effects in a way that has a complexity similar to 3D printing techniques of surfaces with different layers, with different optical qualities, and the like.

A printed layer light transport model allows capturing not only the diffusion effect but also light interferences and light refraction. Suppose that an object (e.g. a custom product) has a reflective surface with some embossing at different portions of the surface. Accurately representing the light diffusion, reflections, and refractions for such a surface using typical raytracing and radiosity techniques would be very difficult, if not impossible. However, as described later, it is possible to accurately represent those effects using a printed layer light transport model presented herein.

2.3.5. Foil Example

Suppose that a designer is designing a product that has a surface covered with a substrate and a foil embossed in portions of the product. There is a number of different ways to represent the light effects on the foil using a set of layers, where one of the layers corresponds to the foil.

The first initial layers may correspond to the substrate of the product and may be printed using, for example, an indigo printing process or some other process, such as a UV printing process or the like.

Since the foil material is deposited over the substrate, the foil material may be represented using another layer. The foil will stick to the substrate. The so-called sleeking process would allow representing adhering of a thin film (representing the foil) that sticks to the areas of the substrate.

Additional layers may include the layers representing the diffuse effect and other effects.

The printing process would include first printing some number of transparent layers or translucent layers, then printing the sleeking layer, and then over-printing the additional layers to represent the embossing effect.

Since the printing utilizing the layers and the printed layer light transport model may be analogized to building up a surface, it is possible to render the surface with different inks until the embossing effect is achieved.

2.3.6. Texture Maps

One way to represent uneven surfaces of substrates is by using a bi-directional reflectance function and, for example, a hemisphere or a full sphere to represent light reflections on a map. The approach allows generating a map that captures the light projection onto a hemisphere/sphere, treats it as the input, and then generates, as the outputs, the coefficients of the input value that a bdrf-function can evaluate. Therefore, rather than performing the physical calculation by executing a full function of the physical interaction between the light and the surface for every pixel and every sub-pixel of the surface, the presented approach pre-computes the inputs and outputs of the light coefficient based on the light projections onto the hemispheres. The light projections onto the hemispheres are referred to as a texture map.

In this context, a texture map is more a global illumination map. The texture map is a global illumination output map that has been customized for a particular material. Content of the texture map is determined based on, for example, the angle of the input and the output light for that particular surface.

2.3.7. Rendering

Rendering of a set of multiple layers includes rendering each layer of the set to represent the object and the corresponding light reflections for which the set was generated.

In a diffuse case, suppose that one wants to print a light translucent yellow over a black color. The current printing techniques (e.g., a standard rip process) would be unable to handle this correctly because it would most like overlay yellow ink over a black color and thus create a green effect.

In some cases, the rip would separate the yellow, print it over white, and print the black separately. That would emulate the transmission of light through the yellow, hitting the substrate and back out, and then the black. In many cases, the colors may be offset. The yellow may be over-printed on the black, and thus a screen print may have some places covered with yellow printed over black, and so forth.

In the case of UV printing, the yellow can be printed over black, and that would lead to a kind of greenish effect. This is due to the diffusion of light through the yellow and back and reflected through the black, and so on.

Therefore, most of the current methods are unable to capture the physical interaction between lights and substrates based on diffusion.

The present approach allows accurately representing the physical interaction between lights and substrates of objects based on diffusion. The printing is based on a custom set of printing layers that in combination allow the representation a variety of different effects. The light is transported through these layers and then it is reflected, refracted, and diffused through the layers.

The light interactions with the objects are captured using a printed layer light transport model that can be customized for different effects, substrates, lights, and the like. A printed layer light transport model can be customized to represent a particular effect, and different printed layer light transport models may be customized to represent different lighting effects. The different printed layer light transport models may be considered pallets of the corresponding different light effects. For example, one pallet may be used to represent the light effects of an oyster shell, while another pallet may be used to represent the light effects on an abalone shell, or another pallet may be used to represent the light effects on a butterfly wing.

2.3.8. Bonding Layer

Relationships between one or more layers are determined in relation to a so-called bonding layer and a receiving layer. The bonding layer is the layer used to bond the light reflection layers to an object, which a receiving layer is a layer of a physical object onto which the other layers are applied.

Suppose that an object has a surface having a curved substrate. An example of such a surface may be a surface of a skateboard. To allow printing on the curved substrate, a bonding layer can be included or placed on the curved surface.

A series of the layers is printed on a bonding layer, and then the layers with the bonding layer are transferred, using thermal transfer to a receiving layer of a physical object.

The types and the number of layers for printing is usually determined by the optical effect that is to be achieved. For example, a designer or an artist may use some layer pallets or templates, and modify them until the desired lighting effect is achieved.

A designer could start, for example, with a foil substrate to represent custom embossing. Then, the designer may select a layer to represent a transparent effect such as stained glass. Then the designer may select a layer to represent a gold metallic look effect. Then the designer may select a layer to represent a translucency overlay to create a pearl-like quality. Once the layers are selected and the corresponding printed layer light transport model is built, the model can be executed to reproduce the desired light effects on a digital representation of the custom product.

In case of uneven surfaces, the foil can be represented using a layer that is sleeked or adhered to a 3D surface. This would allow representing the effect including the reflected light in very particular ways based on that foil.

According to another example, a designer could emboss a surface or have a surface that is a reflective lens, and then use a process of "sleeking" the surface to generate a specific optical effect.

Furthermore, the angle of the surface at which the surface is illuminated by light sources is also taken into account when generating the layers and the corresponding printed layer light transport model.

Generally, a printed layer light transport model is a global illumination map capturing the light visual effect projected on, for example, a sphere or a hemisphere. The map captures the light characteristics that depend on many factors, including the substrate characteristics of the surface, the light characteristics, and the like. The characteristics are used and tuned to represent the specific qualities such as translucency, transparency, reflectivity, diffusion, and the like. The map also captures the reflected light, bounced light, and the like.

3.0. Implementation Example

FIG. 1A illustrates an example of an implementation of a product customization system 100. The system may include one or more consumer computing devices 102, such as 102a, 102b . . . 102n. Each computing device has at least one processing unit, memory, some persistent memory, some other memory, a display device, and input/output devices. Each computing device may be a personal computer, mobile device, cellular device, wireless email device, converged device such as a Treo™ or Blackberry® or the like that permits the consumer to interact with the consumer computing device as well as the system through an application, such as for example a known browser application, being executed by the consumer computing device. Each consumer-computing device may establish a connection with and communicate over a link 104 using a typical secure or unsecured protocol with a product customization unit 106. Link 104 may be implemented using a computer network, a cellular network, a wired or wireless link, and the like. In some implementations, the link is the Internet link.

The product customization unit 106 may be implemented in hardware, software, or a combination of hardware and software. In one embodiment, the product customization unit 106 may be one or more server computers that execute a plurality of lines of computer code to perform the functions and operations of the product customization unit 106 as described below.

In some implementations, the product customization unit 106 may further comprise at least one web server 107 (implemented in hardware or software or a combination of the two). The web server establishes a connection with each consumer computer device, receives requests from each consumer computer device and communicates data and information (such as by using one or more web pages) and requests for consumer computer device information to each consumer computer device wherein the consumer computer device interacts with the web server using a known secure or unsecure protocol and a typical browser application.

The web server, for example, may serve a web page that allows the consumer to browse the available products and designs and then, using the product customization system, customize the particular design of a particular product using user content.

The product customization unit may further include a store 108 that contains and stores the relevant information for the product customization unit including the product information and images for the web pages, customization data, etc.

The product customization unit may further comprise a product customizer 109 (that may be implemented as a plurality of lines of computer code wherein the plurality of lines of computer code are executed by the processing unit(s) of the server computers to implement the product customization system). That allows a consumer to customize a product, allows a consumer to upload user content (images and/or text), allows the consumer to place the user content on the product, allows the consumer to view the customized product for all angles, allows the consumer to customize various features of the product, and manufacture the customized product once it has been designed as described below in more detail.

The product customization unit may further comprise an ecommerce engine 110 that, once the consumer has customized a product with particular user content, may allow the consumer to purchase the customized product. In one implementation, the product customization system may also be part of a larger web site/system.

The system and method described herein may be used by a user or a designer to select and use surfaces with a variety of optical qualities and effects. The system and method include methods for the manufacture of these products, for creating a model of the surface qualities, for displaying images of the products interactively to the user and for calibrating those images based on output of finished product.

The system allows a consumer to control of the color and color changes as the changes take place in, for example, viewing angles (as shown in the user interface examples described below), the surface reflectivity (gloss) of the surface, and the apparent depth of visual elements within the product surface. The system also incorporates a manufacturing process that can apply a material in a specific location on a substrate wherein the material may be bonded to the substrate through the interaction of the material with light, heat, evaporation, electrical charge, or triggered catalytic process. For example, when light is used for the bonding process, the time at which the light is applied, the intensity and the location of light affects the shape of the material deposit as it bonds to the substrate and to its neighboring material deposits and forms a film that whose characteristics change in response to the character of the light. Then, additional materials may be deposited to form layers of deposited films on the substrate with a variety of surface depths and textures.

These surface characteristics can produce the properties such as diffuse (matte) surface, smooth (gloss) surface, figured (Fresnel) surface, refractive (grating) surface and patterned surface.

For example, the substrate may be layered with opaque cut film that may be used to replace opaque printing as described above or the substrate may be layered with subtractive cuts to product relief surfaces for overprint such as laser etching or "sunken-relief". The substrate may also be layered with printing passes to produce relief surfaces for overprint ('bas-relief').

The substrate may also be layered to produce alto/high reliefs (see as shown in wikipedia.org on the Relief page, which is incorporated herein by reference for a definition of the different types of reliefs).

Further, the set of materials deposited on the substrate may have a wide variety of different optical properties: transparency or opacity, refractive index, absorption spectra reflectivity, light phase change (quarter and half wave effects), and polarization changes.

The interaction of the materials in layers may change a wavefront of light to capture a variety of optical effects within the layered film. These may include surface reflection, internal occlusion by layer (opaque regions separated by transparency), refraction by refractive index change, reflection by constructive interference (Lippmann-Bragg effect), refraction by interference (Grating effect), attenuation through polarization, attenuation of reflection through spectral absorption, attenuation of transmission through spectral absorption, and diffusion (translucent regions over dark regions).

The substrate to which these materials are applied may be either a receiver sheet, or a bonding sheet.

In the receiver sheet case:
The receiver sheet may be optically or mechanically configured to produce the product surface texture.
Optically active layers are applied in the viewer to product surface direction.
A product bonding layer is applied last.
The film layer is applied to the complex curved surface of the product using pressure and heat.
Trimming is performed.
The receiver is removed.
In the bonding sheet case:
Optically active layers are applied in the product surface to view direction.
The final layer may be transparent and may be configured by timed attenuation of light.
The film layer is applied to the complex curved surface of the product using pressure and heat.
Trimming is performed.

First, a set of reference film layers is generated to characterize the transport of light through layers produced by a specific manufacturing system. These reference films are used to characterize and model the light transport within chosen layer groups. These groups optimize each optical effect, such as occlusion.

The method for modeling this interaction is described later as the layered light transport component. A transport function is built for each reference film unit. Surface texture libraries are built by layering models of reference-film units interactively; these may be specified at the pixel level. Finished textures are compiled into a simplified layered light transport material and may be selected and applied by users and designers. The resulting design can be viewed interactively.

For purposes of illustrating the product customization system and method, a product customization method and user interface for a skateboard is described below. However, the product customization system may also be used for other products with uneven/textured surfaces in which it is desirable to provide a consumer with the ability to customize the product with user content.

FIG. 1B illustrates more details of the product customization unit 109 that is part of the product customization system. In particular, the product customization unit may further comprise a user interface portion 109a, a user product renderer portion 109b, a layered printed layer light transport model 109c, a manufacturing product renderer portion 109d, a manufacturing portion 109e and a reflection portion 109f. In one implementation, each of these portions may be implemented using a combination of hardware and software. Each of these portions of the product customization unit 109 are described in further detail with reference to FIG. 1C.

Figure 1C:
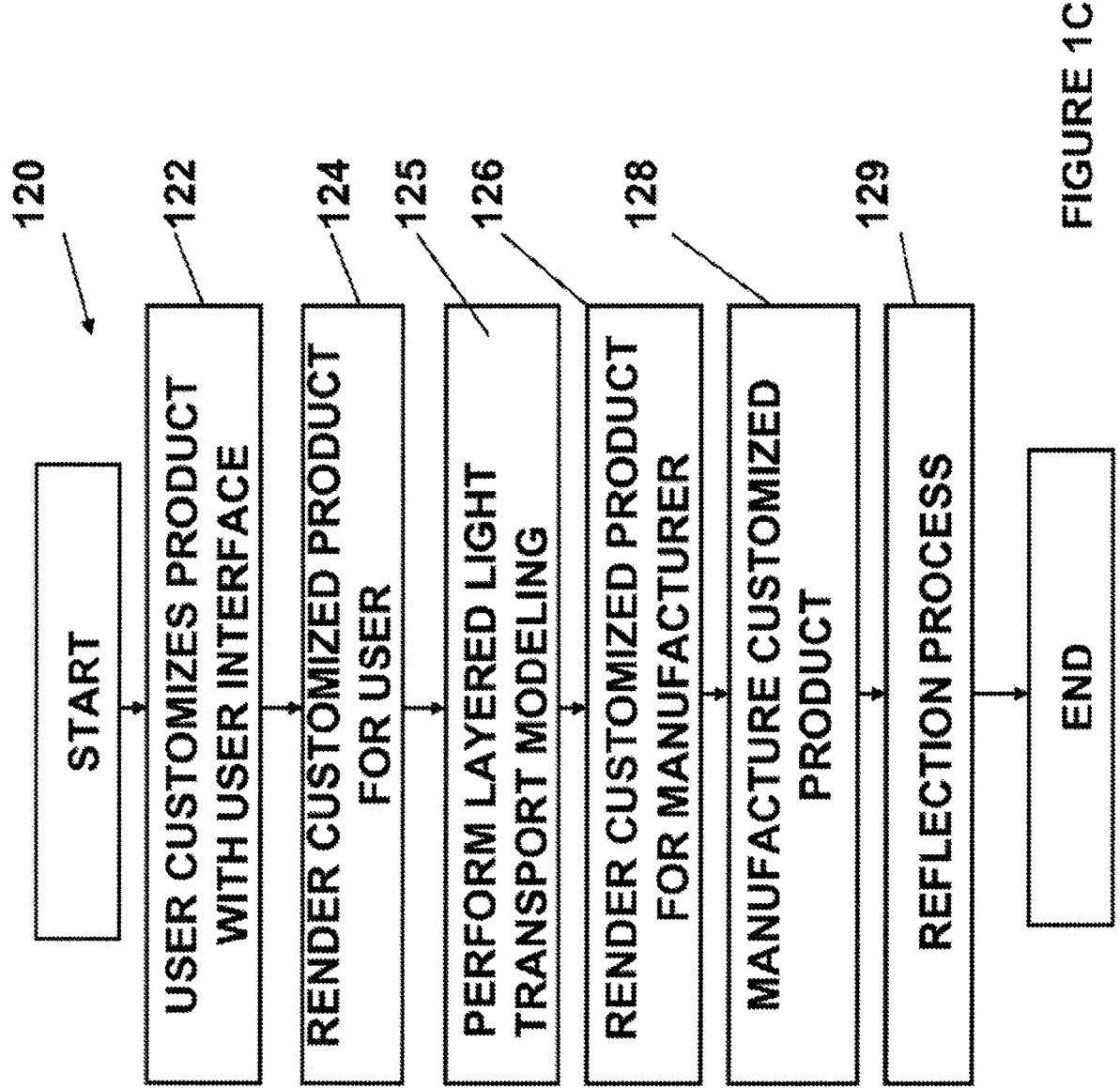
FIG. 1C illustrates an implementation of a method for product customization.

FIG. 1C illustrates an implementation of a method 120 for product customization that may be implemented, for example, by the product customization system shown in FIG. 1A. The method allows the manufacture of user designed products and the method applies user created colors and designs to a product made out of layers of material with specific optical qualities in one embodiment.

4. User Interface Example

The product customization system permits a user/consumer to customize a product using the user interface portion 109a (122) that may be implemented as one more web pages. The user interface portion 109a allows the user to interactively apply a design to a product, such as a skateboard as described below in more detail. The data generated by the user interface portion may include user account data, a product description (that describes the user's custom product), and user image designs (that contains the user content). The data may also include a color choice (the color(s) chosen by the user), material choice (the type of material for the custom product) and the finishing choice (the finishing selected by the user for the custom product). The user interface portion allows the user or designer to perform the following processes using the user interface:
Select a skateboard style and size. (See FIGS. 2A and 2B which are described below)
Select or upload a design containing these items:
  Text.
  Images.
  Vector designs.
Choose a product design area.
Apply design items, and position on 2D surface of design area.
The UI will request and show a rendering of the product with the applied design.
Choose a product design view.
Apply design items projected from view on 3D surface of product from a view direction.
The UI will request and show a rendering of the product with the applied design.
Choose a surface quality (material).
Choose a design item; apply a surface quality from a list.
The UI will request and show a rendering of the product with the new surface quality.
Change and Update the Design (repeat processes 2 through 5 above).
Choose to purchase design on product.
UI processes payment choice.

The user interface portion may also assemble a set of instruction that describe the user design and requests images of the final product from the user product renderer portion 109b. The product customization system then renders the customized product for the user/consumer (124) using the user product renderer portion 109b. The user product renderer portion takes the data/information/description (based on the user interactions with the user interface portion) and other user preferences and using information supplied by the reflection portion 109*f*, synthesizes an image of the manufactured product that is then displayed to the user/consumer.

5. User Renderer Example

In more detail, the user product renderer portion may perform the following processes:
Accepts a UI request for a rendering of a custom product.
  The Request contains:
    Product style
    Product size
    User designs
    Images
    Vector graphics
    Text
  User design properties
    Placement coordinates in design area space.
      Position
      Rotation
      Scale
      Surface Qualities
      Surface selection for each Design Area
      Color
      Shininess
  The User Viewing Geometry

6. User Lighting Geometry Example

Assembles a request for the layered printed layer light transport model for a compiled printed layer light transport model for this product, with the supplied view and lighting.

Renders the compiled printed layer light transport model onto the product geometry.

Returns the rendered product to the user interface component. The reflection portion 109*f* (which provides feedback throughout the product customization unit) generates calibrated color maps and calibrated luminance maps to the calibrated product render assets (including geometry, luminance maps, color maps and safe area coverage maps) that are used to generate the images for the product.

7. Printed Layer Light Transport Modeling

The product customization system then performs the printed layer light transport modeling process (125). The layered printed layer light transport model contains a library of optical interactions between selected layers of materials. The number of layers and therefore the number of interactions is limited by manufacturing constraints. More layers can produce a greater variety of effects but increase the cost of manufacturing the product. For each product, a subset of optical interactions may be chosen. For the purposes of a premium skateboard product, the following layering is used (described from product bonding layer toward viewer).
1. Product surface (wood grain).
2. Product bonding layer (transparent).
3 Opaque reflector: micro fine titanium dioxide pigment in UV activated binder.
4. Macro-layer of transmission attenuated spectral absorption material (pigment) in UV activated transparent binder.
5. UV activated transparent material (refractive index varies from layers 4).
Occluding macro-layer (single opaque reflective absorption or repeat of layers 3 and 4) in UV activated transparent binder.
UV activated transparent material with figured surface (based on, e.g., refractive index varies from layers 5 and 4).

The layered light transport component uses the thin film geometry of the optical system to simplify a printed layer light transport model. It represents each pixel in a printed layer as a referenced volume cell that has 2D angular light inputs and outputs. Each reference volume contains a list of functions to process light inputs and outputs, and calibrated values for each function based on measured response from reference films. Since each volume cell has a known position, the light transport network may be implicitly linked. A request from the user renderer is used to build the volume cell layers. Compiled stacks of volume cells may be placed at each design pixel by reference. The layered printed layer light transport model then uses the supplied light and view vectors to traverse the transport model and compile a textureinput-lightOutput map for the view and lighting of a specific product with user configured surfaces.

In this case, layered light transport reference films would be manufactured for these optical interactions: Response curves for pigment layers 4 and reflectance of layer 3.

These six reference films are manufactured with the needed modulation and are then measured over angular input and output ranges for the volume cell, and each is characterized as a function with associated response values.

7.1. Modeling Example

Figure 1D:
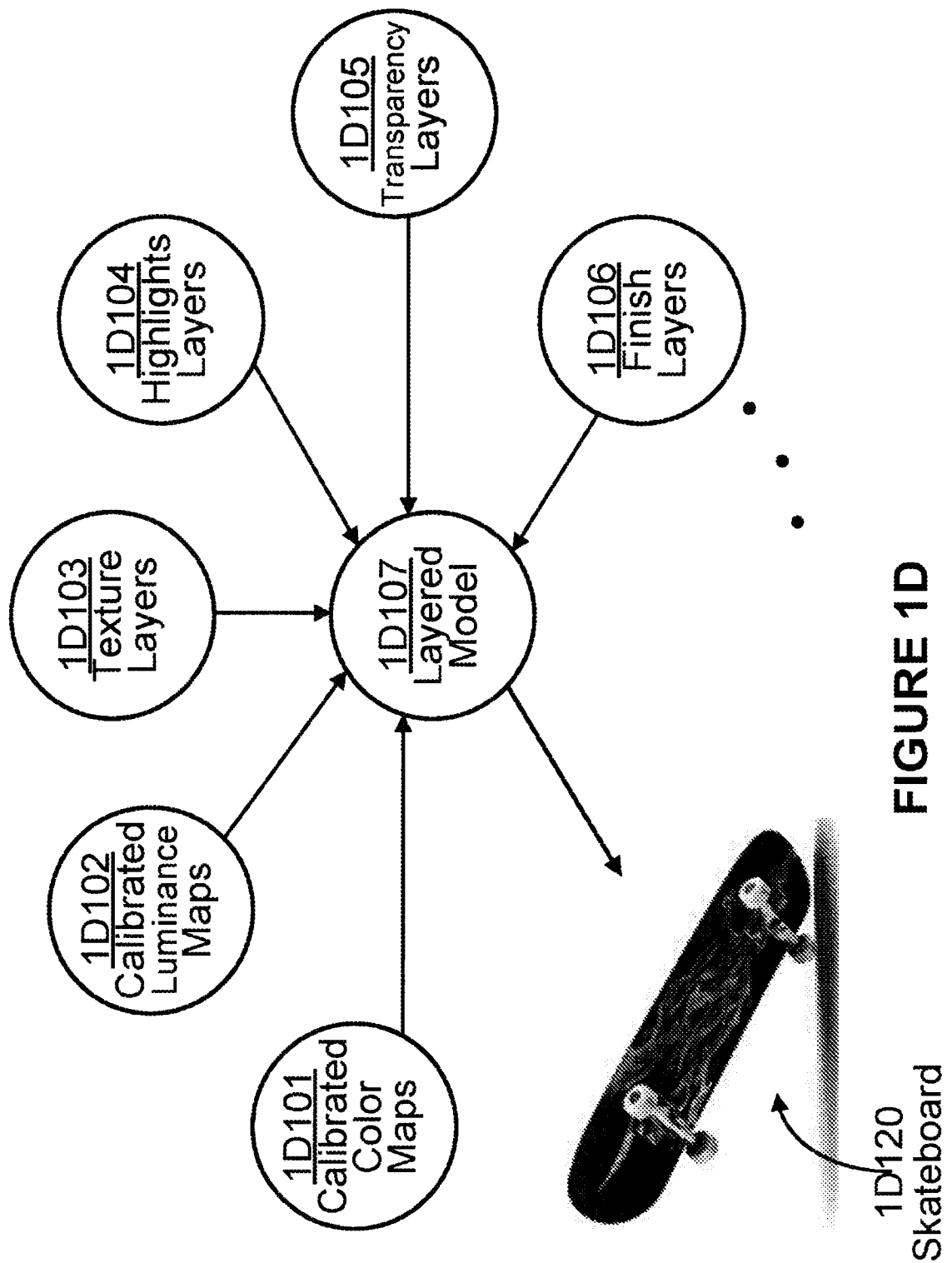
FIG. 1D illustrates an example of a multilayer product customization.

FIG. 1D illustrates an example of a multilayer product customization. An example depicted in the figure includes a layered model 1D107 for a skateboard 1D120. Layered model 1D107 may be a result of composing and/or superimposing various maps and layers, including calibrated color maps 1D101, calibrated luminance maps 1D102, texture layers 1D103, highlights layers 1D10, transparency layers 1D105, finish layers 1D106, and the like. Each of the maps and each of the layers can be fine-tuned to the specific substrate, surface, lighting conditions, and the like. The resulting layered model 1D107 may correspond to a surface-lighting specific printed layer light transport model.

7.2. Layers Example

Figure 1E:
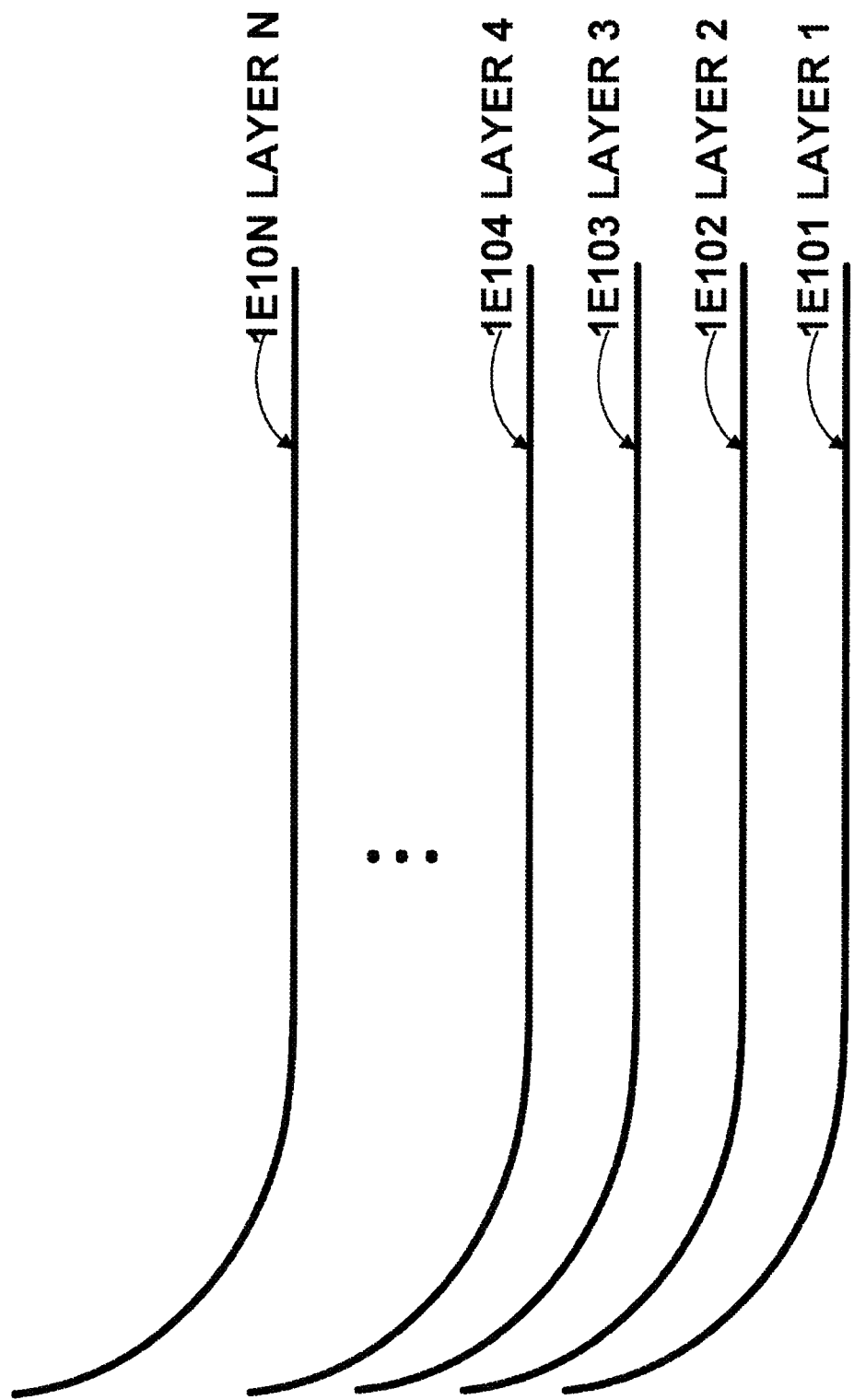
FIG. 1E illustrates an example of multiple layers used in a multilayer product customization approach.

FIG. 1E illustrates an example of multiple layers used in a multilayer product customization approach. In the figure, several layers (a layer 1 1E101, a layer 2 1E102, a layer 3 1E103, a layer 4 1E104, . . . , and a layer N 1E10N1) are superimposed to represent a desired lighting effect.

8. Manufacturing Product Renderer

The product customization system then renders the customized product for the manufacturer (126) using the manufacturing product renderer portion 109*d*. The Manufacturing Renderer takes the User product request and renders the layers and printing instructions needed to print layers on the bonding or receiving film. For each design layer, it positions the user designs using the supplied coordinate systems, tags each pixel with color and surface information, and renders each layer by looking up the layer stack for each surface index. The design is reverse-warped based on data from the reflection interface, so that it will be aligned properly after heat transfer to the complex curved surface.

8.1. Manufacturing Example

The product customization system then manufactures the customized product (128) using the manufacturing portion 109*d*. The manufacturing portion performs, for example, the following processes:

1) manufactures the customized design product;
2) ships the product based on the Operator directions; and/or
3) gathers product information for the Reflection portion (including patterns, reference product with calibration mark-up and/or color and material samples) that are input to a model shot processing component that performs various model shot processing tasks as described in more detail in U.S. patent application Ser. No. 11/925,716 filed on Oct. 26, 2007, entitled "Product Modeling System and Method" which is incorporated herein by reference. The manufacturing process is described in more detail below with reference to FIG. 5.

The product customization system then performs the reflection process (129) using the reflection portion 109f which is a portion of the system that provides feedback to the other portions of the systems. For example, the reflection portion may perform the following tasks: provides updated product information to the manufacturing product renderer portion; 2) manufactures reference product used by the user product renderer portion; 3) calibrates pattern position with the manufactures reference product; 4) provides the calibrated photographic references of a reference product to the user product renderer portion; 5) provides calibrated reflectance and color mapping for the user product renderer portion; and/or provides calibration feedback to the layered printed layer light transport model. The user interface portion of the product customization unit will be described in more detail below.

Figure 2A:
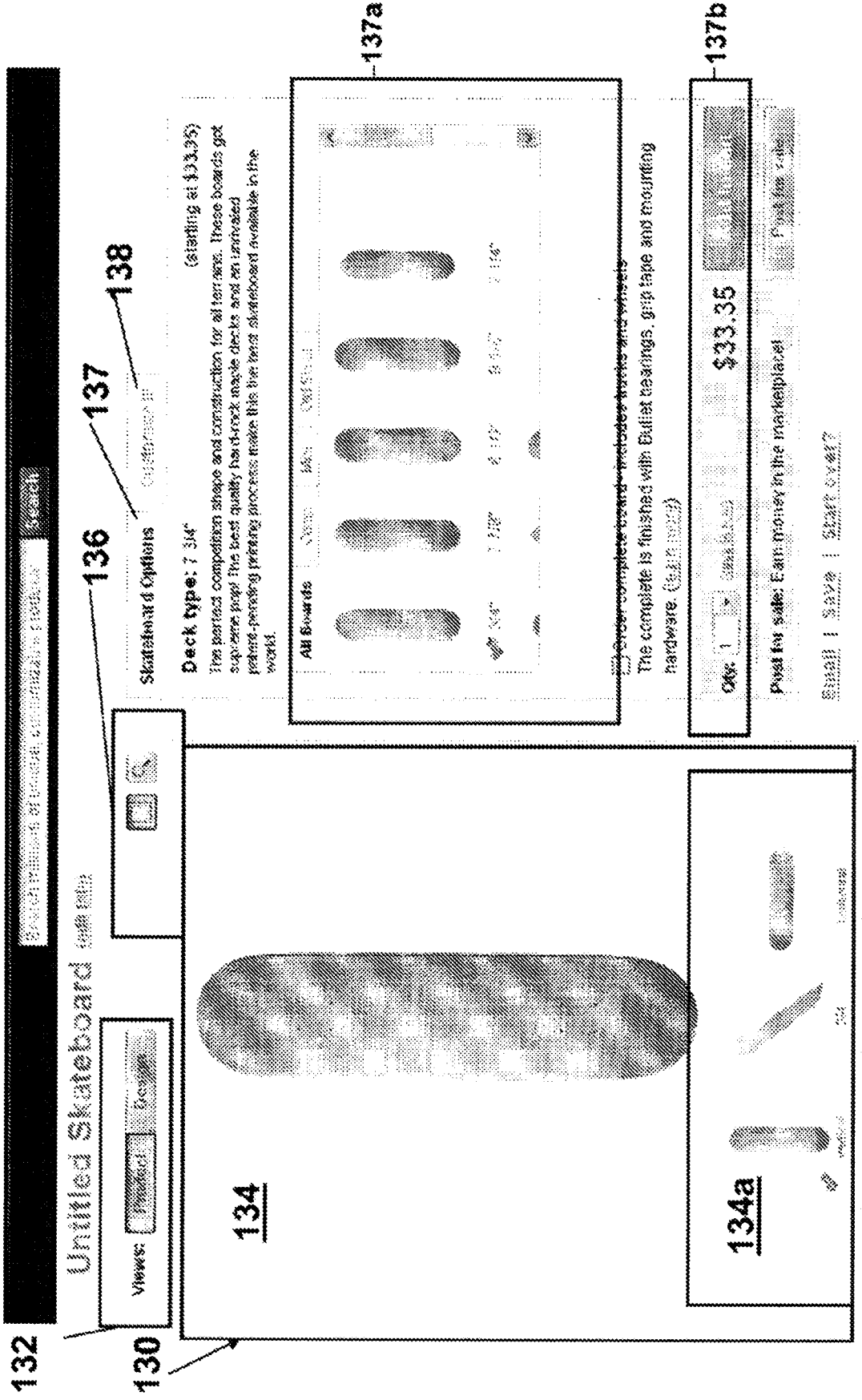
FIGS. 2A and 2B illustrate an example of a product view user interface of the product customization system.
Figure 2B:
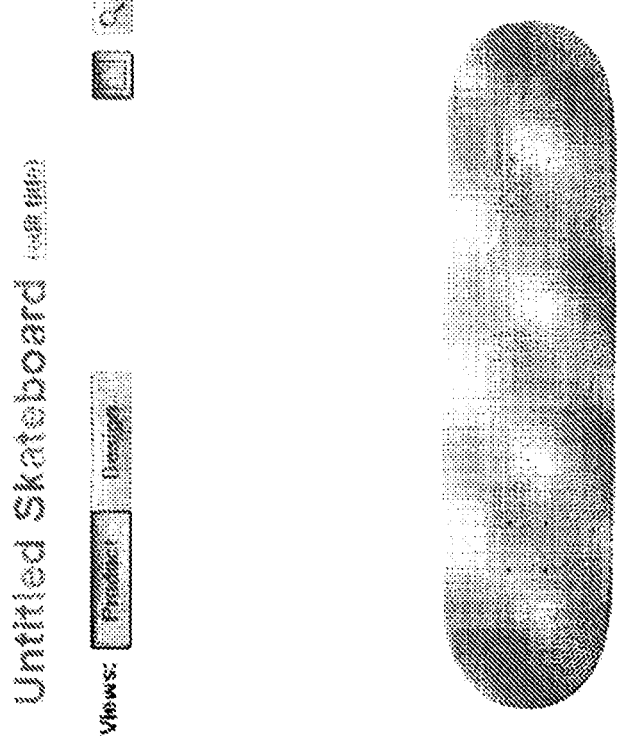

FIGS. 2A and 2B illustrate an example of a user interface 130 of the product customization system. The user interface may include a view option portion 132 that allows the user/consumer to select between a product view as shown in FIG. 2A or 2B (the product image with or without the user content shown) or a design view as shown in FIG. 3 (the pieces of product on which the user/consumer can place the user content) in a view portion 134. The view portion also has a view selector 134a that allows the user/consumer to select among the views (upper, outside quarter, outside front or tongue for example) to be displayed in the view portion. The user interface also allows the user to view the transparency and/or opacity of the design. The user interface may also include a view tools portion 136 that allows the user to cut a portion of the view (dotted box tool), zoom the view (the magnifying glass tool) and/or view the pair of products together in the view portion. In the user interface, as a product moves/is moved by the user or the lighting changes or is changed by the user, the product image shown to the user changes accordingly.

The user interface further comprises a product options tab 137 (a skateboard option tab because the product in the example is a skateboard) that allows the user to select various product options and a customize it tab 138 that allows the user to customize the product with user content as described below in more detail. As shown, the product options tab, in which the product is, for example, a skateboard may further include a product summary portion 137a that displays a summary of the particular product and a commerce portion 137b. That portion allows the user to select a quantity of products to purchase, shows the accumulated price of the products and allows the user to add the customized products to an electronic shopping cart.

FIG. 3 illustrates an example of a product design user interface of the product customization system. The user interface allows the user/consumer to add images using an add images portion and/or add text using an add text portion.

Figure 4A:
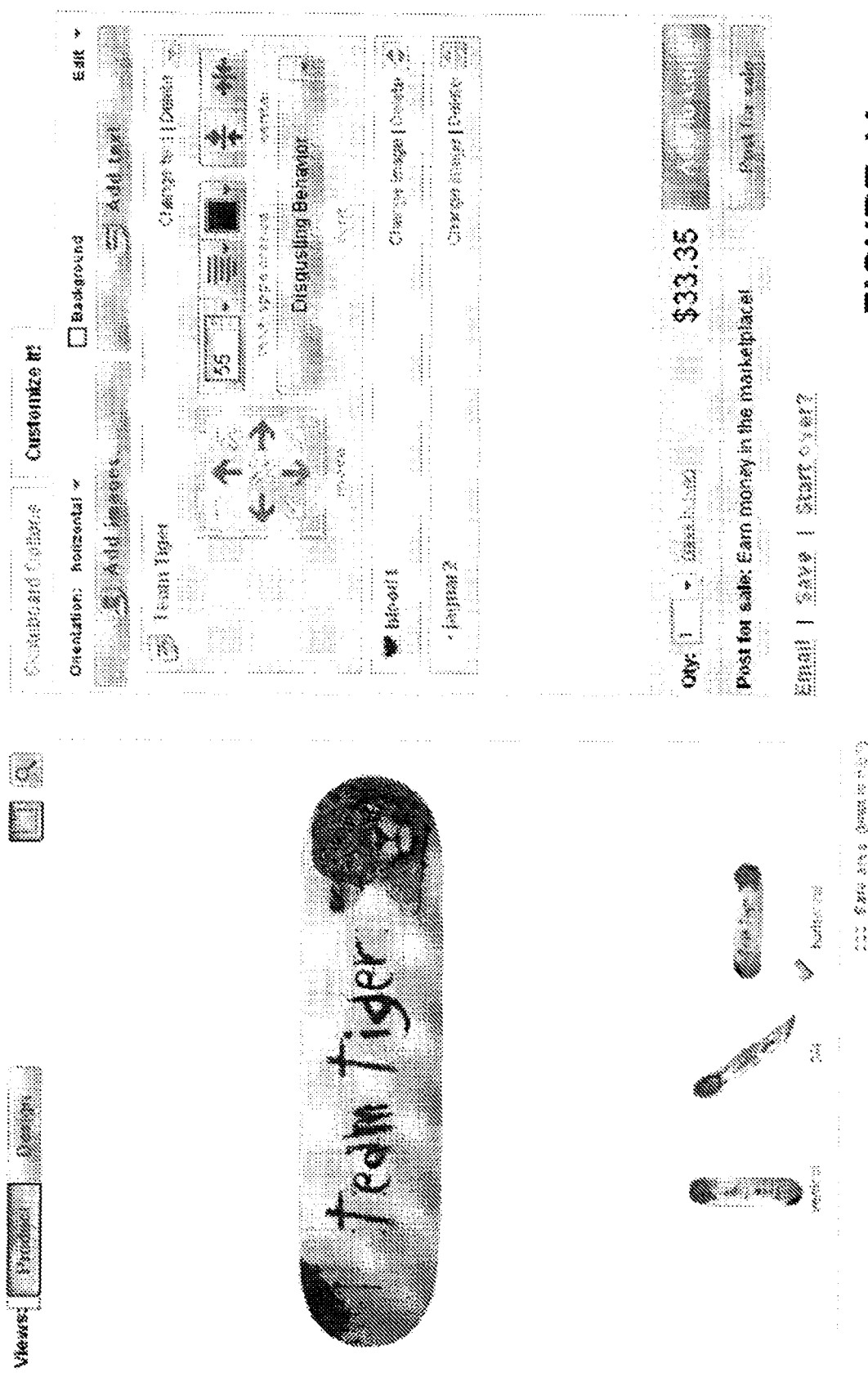

FIGS. 4A and 4B illustrate an example of a product view user interface of the product customization system when a product is a customized user design. Now, the manufacturing process is described in more detail.

8.2. Manufacturing Process Example

Figure 5:
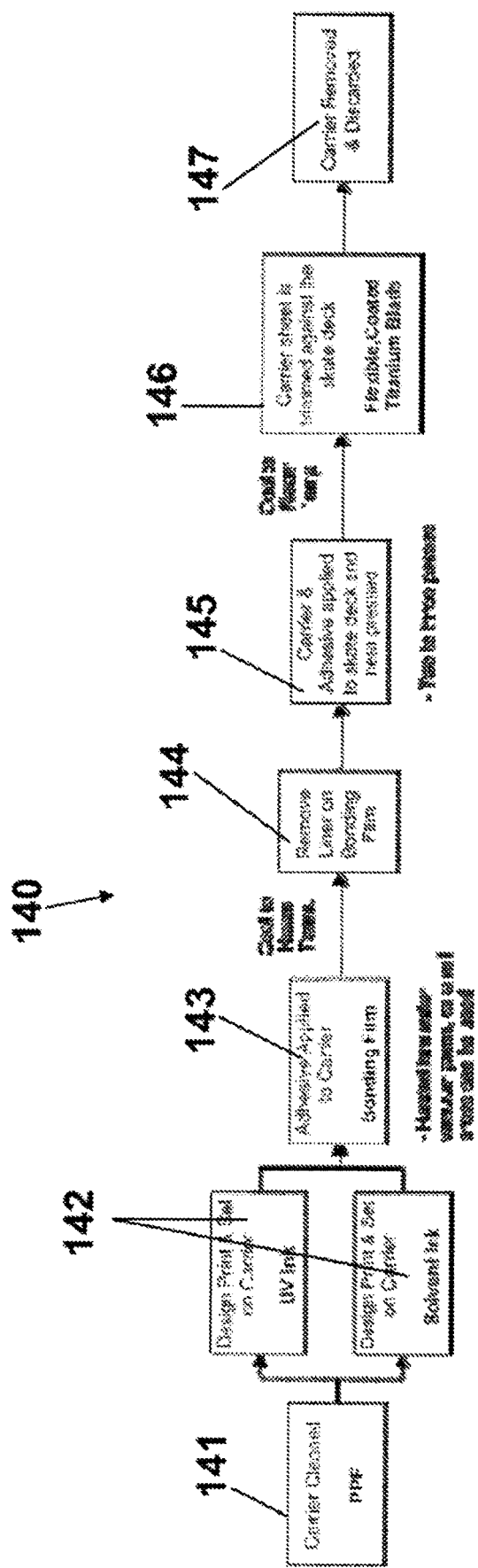
FIG. 5 illustrates more details of the manufacturing process.

FIG. 5 illustrates more details of the manufacturing process 140. In one illustrative example, the following materials and equipment may be used (although the system and method are not limited to these materials and equipment):
Material
Blank skateboard
Print Carrier: proprietary low friction plastic film.
Bonding Film: proprietary, heat-activated thermoplastic film
UV inks
C, M, Y, K+White+Clear Ink
Equipment:
UV Curable, white ink enabled printer (flatbed or roll-to-roll)
Large Format Hot-Laminator
Large Format Vacuum Press
Proprietary heat press for applying bonding film to a curved surface Large Format Vacuum Press
Proprietary heat press for applying bonding film to a curved surface
Proprietary trimming knife As shown in FIG. 5, the manufacturing process may include cleaning a carrier sheet.

In one example, the carrier sheet may be a proprietary low friction plastic film. Once the (141) carrier is cleaned and placed onto a flat surface, the user design is rasterized and sent to the output printer in (2) passes (142). During the first pass, a color layer (printed with CMYK+Clear separations) is laid down, followed by a layer of white ink in the second pass. When UV curable ink is used, the ink may be set immediately by an inline UV lamp attached to the head carriage. When solvent ink is used, the ink is set with the appropriate setting agent. In other embodiments, more than two layers may be laid down on the carrier sheet that creates a layering effect of the design. Furthermore, a white layer may be unnecessary depending on the desirable opacity of the design. In other embodiments, solid inks or soy inks may be used. Once the design is laid down and set on the carrier sheet, an adhesive is applied to the carrier sheet and bonded (143) using a heater laminator, vacuum press or roll press. In one embodiment, a bonding film is applied on top of the UV ink on the carrier sheet. Then, the carrier sheet and bonding film are sent through a bonding station. Then, the liner on the bonding film is removed (144). Then, the liner sheet is registered and positioned on a blank skateboard deck with registration facilitated by using a light table as the carrier sheet is translucent. Once the liner sheet is positioned, the carrier sheet with the adhesive is applied to the skateboard blank (145). In one implementation, the carrier sheet is pressed to the skateboard deck using a proprietary heat press. Then, the skateboard deck is allowed to cool down to room temperature. Then the carrier sheet is trimmed against the skateboard deck using the proprietary trimming knife (146). Then the liner is removed (147) and the customized skateboard deck is complete.

In addition to the manufacturing processes described above, the manufacturing process may also include generating a symbol, tracking number, tracking indicia and/or product identifier (collectively, an "identifier") on an outer portion of the transfer that allows each design or run of designs to be tracked using well known scanning and machine vision techniques. The tracking of the products and designs may be performed by a tracking portion of the system that may be implemented in a plurality of lines of computer code as well as the scanner/machine vision-hardware. Alternatively, the model shot processing described above may be used to recognize a particular product or product run during the manufacturing process.

The identifier also may be applied to the product so that it is non-visible. The techniques for obfuscating the identifier (making it non-visible to a human being) may include:

1) applying the identifier with an ink or dye that has an absorption curve outside of the visible spectrum;
2) encoding the identifier in the halftone or dot pattern of the printed image;
3) applying the identifier as change in surface reflectance;
4) applying the identifier as a change in refractive index (phase change);
5) applying the identifier as a quarter wave film that induces a change in polarization of light;
6) applying the identifier as a change in surface magnetic flux; and/or
7) applying the identifier as a film that causes a change in surface electrical capacitance.

Figure 6:
FIG. 6 illustrates an example of a carrier with a design.
Figure 7:
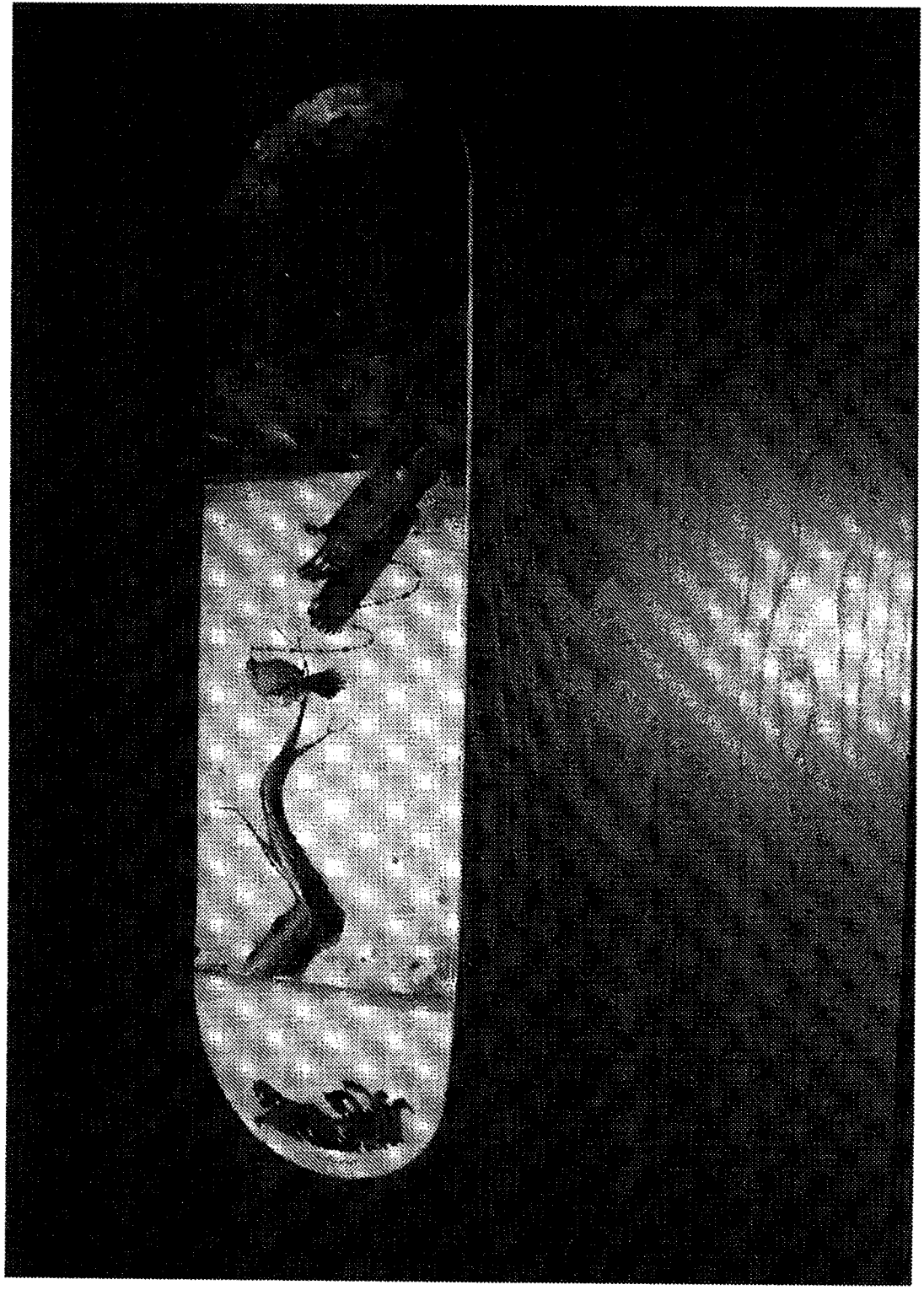
FIG. 7 illustrates a manufactured skateboard with the user design.

FIG. 6 illustrates an example of a carrier with a design and FIG. 7 illustrates a manufactured skateboard with the user design from FIG. 6 bonded to the skateboard.

In addition to the product manufacturing described above, the system and method may also be used to generate a tool that can then be used for mass production of a product with the surface. For example, the tool may be built by using printed layers to form a mask or transfer element for mass produced products. In addition, the tool may be applied to produce multiples with similar optical qualities. The method for production of the tool and subsequent product replication may include:

1) using the methods and system described above that can produce a single layer of a single product to produce a relief (tool which encodes image information as thickness) that is then used to stamp, transfer, or emboss similar or related multiples of the product;
2) using the methods and system described above that can produce a single layer of a single product to produce a mask (tool which encodes image information as a void in a matrix) that is then used for the application of a variety of materials to produce multiples of the product with specific physical or optical characteristics;
3) using the methods and system described above that can produce a single layer of a single product to produce an optical print (tool which encodes the image information as transparency or opacity) that then is used to produce multiples of the product using photographic processes;
4) using the methods and system described above that can produce a single layer of a single product to produce a change in the affinity of a surface for a chemical compound (tool which encodes the image information as water-loving or water resisting for instance) that then is used to produce multiples of the product using this surface affinity; and/or
5) using the methods and system described above that can produce a single layer of a single product to produce a surface change in electrical charge (tool which encode the image information as a change in electrical potential) that is then used to attract and transfer material for transfer. This also may produce similar or related multiples of the original product.

While the foregoing has been with reference to a particular embodiment of the invention, it will be appreciated by those skilled in the art that changes in this embodiment may be made without departing from the principles and spirit of the invention, the scope of which is defined by the appended claims.

9. Example System

In some implementations, a computer implemented system for designing and producing a customized product having at least one bonding film or at least one receiving film comprises a user interface. The user interface generates a user interface so that a design with user content is capable of being applied to an uneven surface of a product wherein the user content comprises one or more of a piece of text, an image, a photograph, a user designed image and a vectored design, the user interface portion that generates a product description that contains the user content, a color of the product, a material of the product and a finishing of the product.

A product renderer portion generates a visual three-dimensional representation of a finished product with the user content shown on the finished produce with the uneven surface based on the product description wherein the visual three-dimensional representation of the finished product with the user content is displayed using the user interface portion.

A printed layer light transport model portion may include a library of optical interactions between selected layers of material for the product. The model may be configured to, in response to a request from the product renderer portion, build a printed layer light transport model to generate optical effects to realistically represent the product renderer portion and to customize foil sleeking and embossing effects to achieve realistic depiction of complex reflective surfaces.

The printed layer light transport model portion is also configured to build a plurality of reference volume cell layers of a plurality of volume cells, a volume cell corresponding to a pixel of the user interface portion by reference, the pixel representing a portion of the displayed user content on the user interface portion, a plurality of referenced volume cells including supplied light and view vectors, wherein the printed layer light transport model portion is configured to use the supplied light and view vectors to compile a texture input-light output map for a view and lighting of a particular uneven surface of the product.

A manufacturing product rendering portion renders, based on the product description and the texture input-light output map, one or more layers of printing for one or more of a bonding layer or a receiving layer and renders one or more printing instructions to print the one or more of the bonding layers or the receiving layers on a film.

The one or more printing instructions, rendered by the manufacturing product-rendering portion, accurately capture manufacturing instructions for manufacturing a customized physical product that corresponds to the visual three-dimensional representation of a digital product displayed in the user interface.

A manufacturing portion, based on the one or more printing instructions, prints the user content to form, respectively, one or more bonding layer films or one or more receiving layer films and that applies the design with user content onto the uneven surface of the product using the films to produce a customized product.

The manufacturing portion ships the customized product to a customer.

Furthermore, the manufacturing portion a reference product with calibration mark-up for the customized product and color and material samples for the customized product.

The system further comprises a reflection portion generates one or more calibrated color maps and one or more calibrated luminance maps. The maps are generated based on the reference product with calibration mark-ups and color and material samples for the customized product. The maps may be provided back to the product renderer portion to improve a visual three-dimensional representation of the finished product and one or more calibrated patterns. One or more visible area layouts are provided back to the manufacturing product rendering portion to improve the one or more layers of printing and one or more printing instructions.

The product is any type of product that may be ordered and customized.

The user interface further comprises one or more web pages.

The user interface portion, the product renderer portion, printed layer light transport model portion, the manufacturing product-rendering portion and the manufacturing portion are associated with a customized product unit. The system further comprises one or more computing devices that are capable of connecting with the customized product unit over a link and wherein each computing device has a browser application executed by a processor of the computing device that is capable of displaying the one or more web pages.

The user interface portion shows one of transparency and opacity of a visual three-dimensional representation of a finished product with the user content.

The manufacturing portion prints an identifier one of the bonding layer and the receiving layer that identifies the user content.

The system may also include a tracking portion that tracks finished products with the user content based on the identifier.

The manufacturing portion produces a customized product with a design having a predetermined depth formed by the one or more layers of printing.

The customized product further comprises a tool used for mass production wherein the tool has a predetermined depth formed by the one or more layers of printing.

The identifier is one of a visible identifier and a non-visible identifier.

10. Example Flow Chart

Figure 8:
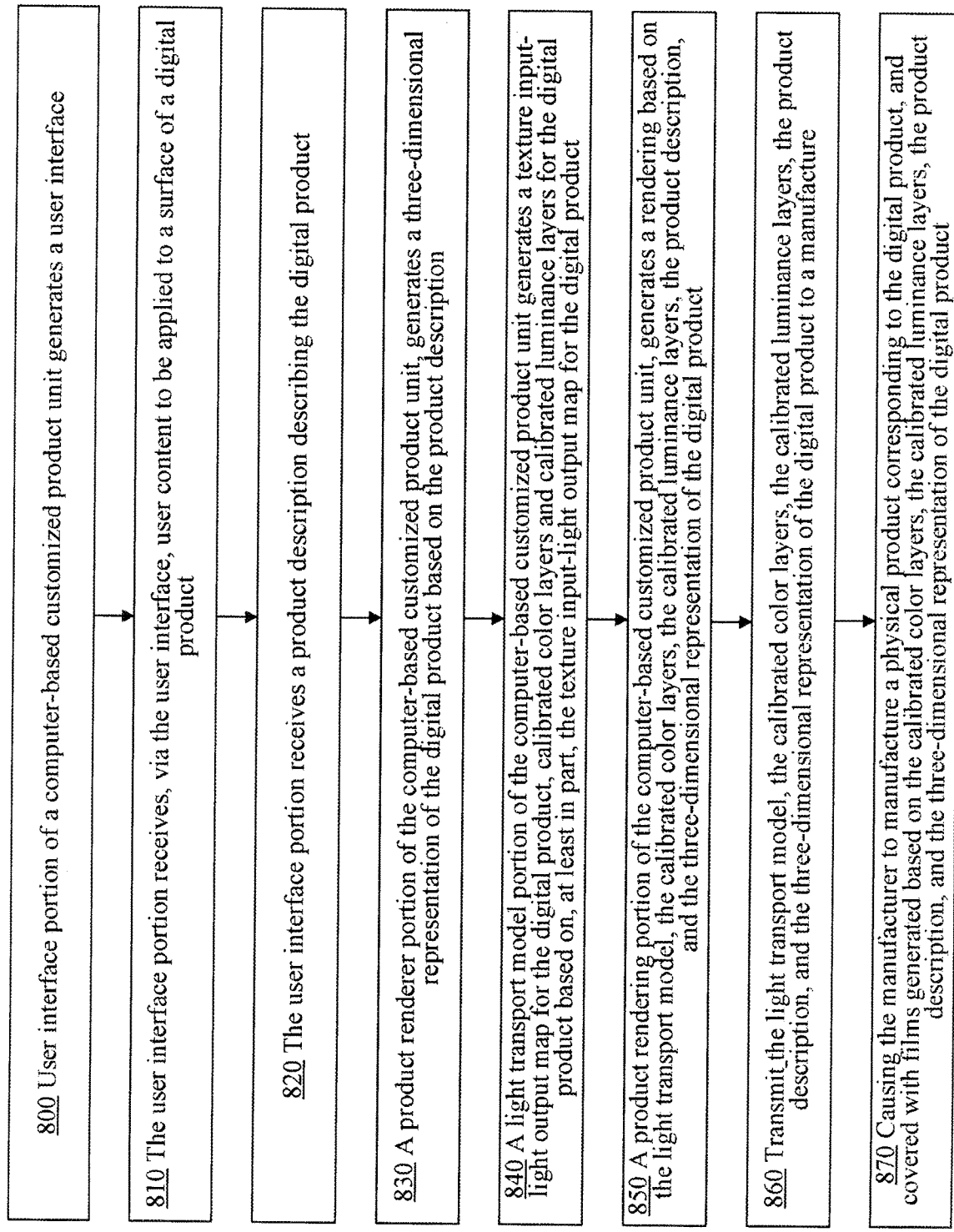
FIG. 8 is an example flow chart.

FIG. 8 is an example flow chart. It is assumed that that a computer-based customized product unit (which may be a combination of hardware and software) has been provided. The computer-based customized product unit comprises various specialized modules/portions that are configured to perform the particular steps of the approach generating a global illumination and light transport models for customizing physical product designed digitally.

In step 800, a user interface portion of the computer-based customized product unit generates a user interface. Examples of the user interface were described above.

In step 810, the user interface portion receives, via the user interface, user content to be applied to a surface of a digital product.

In step 820, the user interface portion receives a product description describing the digital product along with the user content, colors of the product, materials of the product, and finishes for the product.

In strep 830, a product renderer portion of the computer-based customized product unit generates a three-dimensional representation of the digital product based on the product description.

In step 840, a printed layer light transport model portion of the computer-based customized product unit generates a texture input-light output map for the digital product, one or more calibrated color layers and one or more calibrated luminance layers for the digital product based on, at least in part, the texture input-light output map for the digital product.

In addition, in this step, the printed layer light transport model portion of the computer-based customized product unit generates a printed layer light transport model based on the calibrated color layers and the calibrated luminance layers.

The printed layer light transport model models visual effects as lights change their location with respect to the digital product and as the digital product changes its location with respect to a field of view.

The bi-directional reflectance function captures light characteristics of the light distribution using a mapping of the light distribution mapped onto a hemisphere.

The texture input-light output map for the product comprises a lighting vector and a view vector.

The printed layer light transport model comprises a set of constraints for modeling light reflections appearing on the digital product when light sources illuminate the digital product.

The calibrated color maps and the calibrated luminance maps are generated based on reference products, color samples, and material samples, and are calibrated to improve the three-dimensional representation of the product.

Furthermore, the printed layer light transport model is built by executing a bi-directional reflectance function on the product description, the one or more calibrated color layers, and the one or more calibrated luminance layers for the digital product to model a light distribution of the light reflections reflected in different directions and with different intensities from the digital product.

In step 850, a product rendering portion of the computer-based customized product unit, generates a rendering based on the printed layer light transport model, the calibrated color layers, the calibrated luminance layers, the product description, and the three-dimensional representation of the digital product.

The rendering of the digital product is then displayed on a display device.

In step 860, the printed layer light transport model, the calibrated color layers, the calibrated luminance layers, the product description, and the three-dimensional representation of the digital product are transmitted to a manufacture.

This causes the manufacturer to manufacture, using manufacturing instructions, a physical product corresponding to the digital product, and covered with films generated based on the one or more calibrated color layers, the one or more calibrated luminance layers, the product description, and the three-dimensional representation of the digital product.

11. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
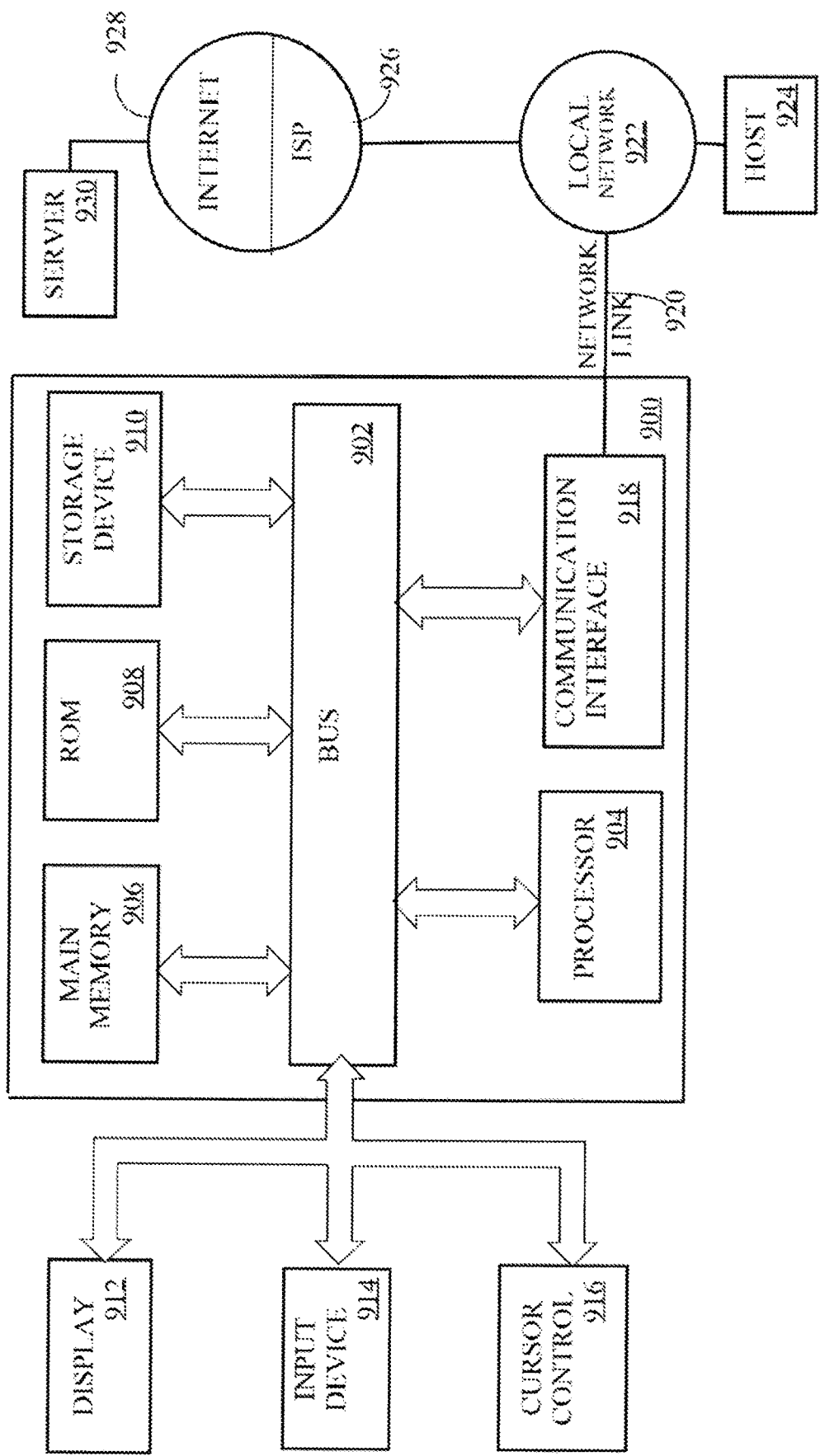
FIG. 9 is a block diagram of a computer system on which embodiments of the approach may be implemented.

FIG. 9 is a block diagram that depicts an example computer system 900 upon which embodiments may be implemented. Computer system 900 includes a bus 902 or other communication mechanism for communicating information, and a processor 904 coupled with bus 902 for processing information. Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. Although bus 902 is illustrated as a single bus, bus 902 may comprise one or more buses. For example, bus 902 may include without limitation a control bus by which processor 904 controls other devices within computer system 900, an address bus by which processor 904 specifies memory locations of instructions for execution, or any other type of bus for transferring data or signals between components of computer system 900.

An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input-device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic or computer software which, in combination with the computer system, causes or programs computer system 900 to be a special-purpose machine. According to one embodiment, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 900, various computer-readable media are involved, for example, in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip, or memory cartridge, or any other medium from which a computer can read.

Various forms of computer-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated service digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 928. Local network 922 and Internet 928 both use electrical, electromagnetic, or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for designing and producing a customized product using global illumination and printed layer light transport models, the method comprising:
   providing a computer-based customized product unit;
   generating, using a user interface portion of the computer-based customized product unit, a user interface;
   receiving, via the user interface, user content to be applied to a surface of a digital product;
   generating, using the user interface portion, a product description describing the digital product along with the user content, colors of the product, materials of the product, and finishes for the product;
   generating, using a product renderer portion of the computer-based customized product unit, a three-dimensional representation of the digital product based on the product description;
   generating, using a printed layer light transport model portion of the computer-based customized product unit, a texture input-light output map for the digital product;
   generating, using the printed layer light transport model portion of the computer-based customized product unit, one or more calibrated color layers and one or more calibrated luminance layers for the digital product based on, at least in part, the texture input-light output map for the digital product;
   generating, using the printed layer light transport model portion of the computer-based customized product unit, a printed layer light transport model based on the one or more calibrated color layers and the one or more calibrated luminance layers;
   wherein the printed layer light transport model comprises a set of constraints for modeling light reflections appearing on the digital product when light sources illuminate the digital product;
   wherein the printed layer light transport model is built by executing a bi-directional reflectance function on the product description, the one or more calibrated color layers, and the one or more calibrated luminance layers for the digital product to model a light distribution of the light reflections reflected in different directions and with different intensities from the digital product;
   generating, using a product rendering portion of the computer-based customized product unit, a rendering based on the printed layer light transport model, the one or more calibrated color layers, the one or more calibrated luminance layers, the product description, and the three-dimensional representation of the digital product;
   transmitting the printed layer light transport model, the one or more calibrated color layers, the one or more calibrated luminance layers, the product description, and the three-dimensional representation of the digital product to a manufacture;
   causing the manufacturer to manufacture, using manufacturing instructions, a physical product corresponding to the digital product, and covered with films generated based on the one or more calibrated color layers, the one or more calibrated luminance layers, the product description, and the three-dimensional representation of the digital product.

2. The method of claim 1, wherein the printed layer light transport model models visual effects as lights change their location with respect to the digital product and as the digital product changes its location with respect to a field of view.

3. The method of claim 1, wherein the bi-directional reflectance function captures light characteristics of the light distribution using a mapping of the light distribution mapped onto a hemisphere.

4. The method of claim 1, wherein the user content comprises one or more of: text, an image, a photograph, a user-designed image, or a vectored design;
   wherein the surface of the product is an uneven surface of the product.

5. The method of claim 1, wherein the texture input-light output map for the product comprises a lighting vector and a view vector.

6. The method of claim 1, wherein the calibrated color maps and the calibrated luminance maps are generated based on reference products, color samples, and material samples, and are calibrated to improve the three-dimensional representation of the product.

7. The method of claim 1, further comprises displaying the rendering of the digital product on a display device.

8. A computer-implemented system for generating global illumination and printed layer light transport models of customizing physical products designed digitally, the system comprises:
   a computer-based customized product unit comprising a user interface portion, a product rendered portion, and a printed layer light transport model portion;
   a computer processor executing computer instructions included in the computer-based customized product unit to cause:
   generating, using the user interface portion of the computer-based customized product unit, a user interface;
   receiving, via the user interface, user content to be applied to a surface of a digital product;
   generating, using the user interface portion, a product description describing the digital product along with the user content, colors of the product, materials of the product, and finishes for the product;
   generating, using the product renderer portion of the computer-based customized product unit, a three-dimensional representation of the digital product based on the product description;
   generating, using the printed layer light transport model portion of the computer-based customized product unit, a texture input-light output map for the digital product;
   generating, using the printed layer light transport model portion of the computer-based customized product unit, one or more calibrated color layers and one or more calibrated luminance layers for the digital product based on, at least in part, the texture input-light output map for the digital product;

generating, using the printed layer light transport model portion of the computer-based customized product unit, a printed layer light transport model based on the one or more calibrated color layers and the one or more calibrated luminance layers;

wherein the printed layer light transport model comprises a set of constraints for modeling light reflections appearing on the digital product when light sources illuminate the digital product;

wherein the printed layer light transport model is built by executing a bi-directional reflectance function on the product description, the one or more calibrated color layers, and the one or more calibrated luminance layers for the digital product to model a light distribution of the light reflections reflected in different directions and with different intensities from the digital product;

generating, using a product rendering portion of the computer-based customized product unit, a rendering based on the printed layer light transport model, the one or more calibrated color layers, the one or more calibrated luminance layers, the product description, and the three-dimensional representation of the digital product;

transmitting the printed layer light transport model, the one or more calibrated color layers, the one or more calibrated luminance layers, the product description, and the three-dimensional representation of the digital product to a manufacture;

causing the manufacturer to manufacture, using manufacturing instructions, a physical product corresponding to the digital product, and covered with films generated based on the one or more calibrated color layers, the one or more calibrated luminance layers, the product description, and the three-dimensional representation of the digital product.

9. The computer-implemented system of claim 8, wherein the printed layer light transport model models visual effects as lights change their location with respect to the digital product and as the digital product changes its location with respect to a field of view.

10. The computer-implemented system of claim 8, wherein the bi-directional reflectance function captures light characteristics of the light distribution using a mapping of the light distribution mapped onto a hemisphere.

11. The computer-implemented system of claim 8, wherein the user content comprises one or more of: text, an image, a photograph, a user-designed image, or a vectored design;
wherein the surface of the product is an uneven surface of the product.

12. The computer-implemented system of claim 8, wherein the texture input-light output map for the product comprises a lighting vector and a view vector.

13. The computer-implemented system of claim 8, wherein the calibrated color maps and the calibrated luminance maps are generated based on reference products, color samples, and material samples, and are calibrated to improve the three-dimensional representation of the product.

14. The computer-implemented system of claim 8, storing additional instructions for displaying the rendering of the digital product on a display device.

15. One or more non-transitory computer-readable storage media storing one or more sequences of instructions which, when executed by one or more processors, cause the one or more processors to perform:

providing a computer-based customized product unit;

generating, using a user interface portion of the computer-based customized product unit, a user interface;

receiving, via the user interface, user content to be applied to a surface of a digital product;

generating, using the user interface portion, a product description describing the digital product along with the user content, colors of the product, materials of the product, and finishes for the product;

generating, using a product renderer portion of the computer-based customized product unit, a three-dimensional representation of the digital product based on the product description;

generating, using a printed layer light transport model portion of the computer-based customized product unit, a texture input-light output map for the digital product;

generating, using the printed layer light transport model portion of the computer-based customized product unit, one or more calibrated color layers and one or more calibrated luminance layers for the digital product based on, at least in part, the texture input-light output map for the digital product;

generating, using the printed layer light transport model portion of the computer-based customized product unit, a printed layer light transport model based on the one or more calibrated color layers and the one or more calibrated luminance layers;

wherein the printed layer light transport model comprises a set of constraints for modeling light reflections appearing on the digital product when light sources illuminate the digital product;

wherein the printed layer light transport model is built by executing a bi-directional reflectance function on the product description, the one or more calibrated color layers, and the one or more calibrated luminance layers for the digital product to model a light distribution of the light reflections reflected in different directions and with different intensities from the digital product;

generating, using a product rendering portion of the computer-based customized product unit, a rendering based on the printed layer light transport model, the one or more calibrated color layers, the one or more calibrated luminance layers, the product description, and the three-dimensional representation of the digital product;

transmitting the printed layer light transport model, the one or more calibrated color layers, the one or more calibrated luminance layers, the product description, and the three-dimensional representation of the digital product to a manufacture;

causing the manufacturer to manufacture, using manufacturing instructions, a physical product corresponding to the digital product, and covered with films generated based on the one or more calibrated color layers, the one or more calibrated luminance layers, the product description, and the three-dimensional representation of the digital product.

16. The one or more non-transitory computer-readable storage media of claim 15, wherein the printed layer light transport model models visual effects as lights change their location with respect to the digital product and as the digital product changes its location with respect to a field of view.

17. The one or more non-transitory computer-readable storage media of claim 15, wherein the bi-directional reflectance function captures light characteristics of the light distribution using a mapping of the light distribution mapped onto a hemisphere.

18. The one or more non-transitory computer-readable storage media of claim 15, wherein the user content comprises one or more of: text, an image, a photograph, a user-designed image, or a vectored design;
    wherein the surface of the product is an uneven surface of the product.

19. The one or more non-transitory computer-readable storage media of claim 15, wherein the texture input-light output map for the product comprises a lighting vector and a view vector.

20. The one or more non-transitory computer-readable storage media of claim 15, wherein the calibrated color maps and the calibrated luminance maps are generated based on reference products, color samples, and material samples, and are calibrated to improve the three-dimensional representation of the product.

\* \* \* \* \*